United States Patent
Sole Rojals et al.

(10) Patent No.: US 9,167,253 B2
(45) Date of Patent: Oct. 20, 2015

(54) DERIVATION OF THE POSITION IN SCAN ORDER OF THE LAST SIGNIFICANT TRANSFORM COEFFICIENT IN VIDEO CODING

(75) Inventors: Joel Sole Rojals, La Jolla, CA (US); Rajan Laxman Joshi, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 522 days.

(21) Appl. No.: 13/534,306

(22) Filed: Jun. 27, 2012

(65) Prior Publication Data

US 2013/0003834 A1    Jan. 3, 2013

Related U.S. Application Data

(60) Provisional application No. 61/502,269, filed on Jun. 28, 2011, provisional application No. 61/503,529, filed on Jun. 30, 2011, provisional application No. 61/550,775, filed on Oct. 24, 2011, provisional application No. 61/550,784, filed on Oct. 24, 2011.

(51) Int. Cl.
*H04N 19/13* (2014.01)
*H04N 19/91* (2014.01)
*H04N 19/196* (2014.01)
(Continued)

(52) U.S. Cl.
CPC ............. *H04N 19/13* (2014.11); *H04N 19/129* (2014.11); *H04N 19/196* (2014.11); *H04N 19/44* (2014.11); *H04N 19/463* (2014.11); *H04N 19/91* (2014.11)

(58) Field of Classification Search
CPC ............. H04N 7/30; H04N 7/12; H04N 7/26; H04N 7/50; H04N 19/00763; H04N 7/32; H03M 7/00; G09G 5/36
USPC ............. 375/240.02, 240.03, 240.12, 240.07, 375/240.18; 341/107; 345/557
See application file for complete search history.

(56) References Cited

U.S. PATENT DOCUMENTS

| 1,679,903 A | 8/1928 | Holinger |
| 5,295,203 A | 3/1994 | Krause et al. |

(Continued)

FOREIGN PATENT DOCUMENTS

| EP | 1041826 A1 | 10/2000 |
| EP | 1679903 A2 | 7/2006 |

(Continued)

OTHER PUBLICATIONS

Anonymous, "Test Model Under Consideration", Joint Collaborative Team on Video Coding, Document: JCTVC-B205, Jul. 21-28, 2010, 152 pp.

(Continued)

*Primary Examiner* — Jorge L Ortiz Criado
*Assistant Examiner* — Albert Kir
(74) *Attorney, Agent, or Firm* — Shumaker & Sieffert, P.A.

(57) ABSTRACT

A video decoder converts a block-based LSC indicator into a scan-based LSC indicator. The block-based LSC indicator indicates coordinates of a last significant coefficient of a block of transform coefficients according to a scanning order. The scan-based LSC indicator indicates an ordinal position of the LSC according to the scanning order. The video decoder may decode, based on the scan-based LSC indicator, a significance map for the block.

14 Claims, 13 Drawing Sheets

(51) Int. Cl.
*H04N 19/129* (2014.01)
*H04N 19/463* (2014.01)
*H04N 19/44* (2014.01)

(56) References Cited

U.S. PATENT DOCUMENTS

| | | | |
|---|---|---|---|
| 5,583,657 A | 12/1996 | Jeong | |
| 5,631,744 A | 5/1997 | Takeuchi et al. | |
| 5,818,877 A | 10/1998 | Tsai et al. | |
| 5,838,825 A | 11/1998 | Obayashi et al. | |
| 5,852,469 A | 12/1998 | Nagai et al. | |
| 6,301,304 B1 | 10/2001 | Jing et al. | |
| 6,646,578 B1 | 11/2003 | Au | |
| 6,680,974 B1 | 1/2004 | Faryar et al. | |
| 6,775,414 B1 | 8/2004 | Fogg et al. | |
| 6,856,701 B2 | 2/2005 | Karczewicz et al. | |
| 7,369,066 B1 | 5/2008 | Benzreba et al. | |
| 7,376,280 B2 | 5/2008 | Handley et al. | |
| 7,379,608 B2 | 5/2008 | Marpe et al. | |
| 7,483,575 B2 | 1/2009 | Fukuhara et al. | |
| 7,522,774 B2 | 4/2009 | Ramasastry et al. | |
| 7,535,387 B1 | 5/2009 | Delva | |
| 7,609,904 B2 | 10/2009 | Miller | |
| 7,702,013 B2 | 4/2010 | Schwarz et al. | |
| 7,813,567 B2 | 10/2010 | Sankaran | |
| 7,843,998 B2 | 11/2010 | Bjontegaard | |
| 7,885,473 B2 | 2/2011 | Sankaran | |
| 7,920,629 B2 | 4/2011 | Bjontegaard et al. | |
| 8,311,119 B2 | 11/2012 | Srinivasan | |
| 8,446,301 B2 * | 5/2013 | He et al. | 341/107 |
| 8,687,904 B2 | 4/2014 | Sasai et al. | |
| 8,861,599 B2 | 10/2014 | Auyeung et al. | |
| 2003/0016876 A1 | 1/2003 | Chai et al. | |
| 2003/0048208 A1 | 3/2003 | Karczewicz | |
| 2003/0128886 A1 | 7/2003 | Said | |
| 2004/0184544 A1 | 9/2004 | Kondo et al. | |
| 2005/0036549 A1 | 2/2005 | He et al. | |
| 2005/0078754 A1 | 4/2005 | Liang et al. | |
| 2006/0044317 A1 * | 3/2006 | Bourd et al. | 345/557 |
| 2006/0078049 A1 | 4/2006 | Bao et al. | |
| 2006/0227865 A1 | 10/2006 | Sherigar | |
| 2007/0036223 A1 | 2/2007 | Srinivasan | |
| 2007/0071331 A1 | 3/2007 | Liu | |
| 2007/0285285 A1 | 12/2007 | Puri et al. | |
| 2008/0013633 A1 | 1/2008 | Ye et al. | |
| 2008/0089425 A1 | 4/2008 | Karczewicz | |
| 2008/0152015 A1 | 6/2008 | Benzreba et al. | |
| 2008/0219578 A1 | 9/2008 | Lee | |
| 2008/0310504 A1 | 12/2008 | Ye et al. | |
| 2008/0310507 A1 | 12/2008 | Ye et al. | |
| 2008/0310745 A1 | 12/2008 | Ye et al. | |
| 2009/0067503 A1 | 3/2009 | Jeong et al. | |
| 2009/0154820 A1 | 6/2009 | Li et al. | |
| 2009/0175332 A1 | 7/2009 | Karczewicz et al. | |
| 2009/0201994 A1 | 8/2009 | Schwarz et al. | |
| 2009/0201995 A1 | 8/2009 | Schwarz et al. | |
| 2009/0201996 A1 | 8/2009 | Schwarz et al. | |
| 2009/0202158 A1 | 8/2009 | Hwang et al. | |
| 2009/0232204 A1 * | 9/2009 | Lee et al. | 375/240.02 |
| 2009/0273706 A1 | 11/2009 | Tu et al. | |
| 2010/0020867 A1 | 1/2010 | Wiegand et al. | |
| 2010/0040148 A1 | 2/2010 | Marpe et al. | |
| 2010/0097248 A1 | 4/2010 | Sze et al. | |
| 2010/0097250 A1 | 4/2010 | Demircin et al. | |
| 2010/0098155 A1 | 4/2010 | Demircin et al. | |
| 2010/0111432 A1 | 5/2010 | Mohr | |
| 2010/0118971 A1 | 5/2010 | Tanida et al. | |
| 2010/0141489 A1 | 6/2010 | Reznik | |
| 2010/0150226 A1 | 6/2010 | Hallapuro et al. | |
| 2010/0324912 A1 | 12/2010 | Choo et al. | |
| 2011/0001643 A1 | 1/2011 | Sze et al. | |
| 2011/0080956 A1 | 4/2011 | Zhou et al. | |
| 2011/0090955 A1 | 4/2011 | Liu et al. | |
| 2011/0096834 A1 | 4/2011 | Cheon et al. | |
| 2011/0097003 A1 | 4/2011 | Alshina et al. | |
| 2011/0103489 A1 | 5/2011 | Takada | |
| 2011/0206135 A1 | 8/2011 | Drugeon et al. | |
| 2011/0206289 A1 | 8/2011 | Dikbas et al. | |
| 2011/0243220 A1 | 10/2011 | Seregin et al. | |
| 2011/0249755 A1 | 10/2011 | Shibahara et al. | |
| 2011/0255799 A1 | 10/2011 | Omori | |
| 2011/0268183 A1 | 11/2011 | Sole Rojas et al. | |
| 2012/0027081 A1 | 2/2012 | Endresen et al. | |
| 2012/0082233 A1 | 4/2012 | Sze et al. | |
| 2012/0140813 A1 | 6/2012 | Sole Rojals et al. | |
| 2012/0140814 A1 | 6/2012 | Sole Rojals et al. | |
| 2012/0163456 A1 | 6/2012 | Coban et al. | |
| 2012/0163469 A1 | 6/2012 | Kim et al. | |
| 2012/0163472 A1 | 6/2012 | Sole Rojals et al. | |
| 2012/0183052 A1 * | 7/2012 | Lou et al. | 375/240.03 |
| 2012/0236929 A1 | 9/2012 | Liu | |
| 2012/0262313 A1 | 10/2012 | He et al. | |
| 2012/0269263 A1 | 10/2012 | Bordes et al. | |
| 2012/0288003 A1 | 11/2012 | Do et al. | |
| 2013/0051459 A1 * | 2/2013 | Kirchhoffer et al. | 375/240.07 |
| 2013/0051472 A1 | 2/2013 | Wiegand et al. | |
| 2013/0058407 A1 | 3/2013 | Sole Rojals et al. | |
| 2013/0114731 A1 * | 5/2013 | Lee et al. | 375/240.18 |
| 2013/0343454 A1 * | 12/2013 | Yeo et al. | 375/240.03 |
| 2014/0307777 A1 | 10/2014 | Sole et al. | |
| 2014/0341274 A1 | 11/2014 | Sole et al. | |

FOREIGN PATENT DOCUMENTS

| | | |
|---|---|---|
| EP | 1768415 A1 | 3/2007 |
| EP | 2182732 A1 | 5/2010 |
| JP | 2003224851 A | 8/2003 |
| JP | 2006211304 A | 8/2006 |
| WO | 2007043583 A1 | 4/2007 |
| WO | WO2007063472 A2 | 6/2007 |
| WO | WO2009075445 A1 | 6/2009 |
| WO | 2009134575 A2 | 11/2009 |
| WO | 2010018138 A1 | 2/2010 |
| WO | WO2010131546 A1 | 11/2010 |
| WO | 2010143853 A2 | 12/2010 |
| WO | WO2011128303 A2 | 10/2011 |

OTHER PUBLICATIONS

Bjontegaard et al., "Context-Adaptive VLC (CVLC) Coding of Coefficients," Joint Video Team, JVT-C028 May 6-10, 2002, 8 pp.

Choi et al., "Adaptive Coefficient Scanning Based on the Intra Prediction Mode", ETRI Journal, vol. 29, No. 5, Oct. 2007, 3 pp.

Davies, "BBC's Response to the Call for Proposals on Video Compression Technologies," Joint Collaborative Team on Video Coding, JCTVC-A125, Apr. 15-23, 2010, 30 pp.

Davies et al., "Suggestion for a Test Model", Joint Collaborative Team on Video Coding, JCTVC-A033, Apr. 15-23, 2010, pp. 30.

International Telecommunication Union, "Advanced video coding for generic audiovisual services," Telecommunication Standardization Sector, H.264, Mar. 2010, 669 pp.

Jia et al., "A most probable scan mode decision for H.264/AVC inter picture coding", IEEE International Conference on Computer Science and Information Technology, Aug. 8, 2009, 5 pp.

Jong H. Lee, et al. "An Efficient Encoding of DCT Blocks with Block-Adaptive Scanning." pp. 1483-1494 XP000498064. Lee et al., "An Efficient Encoding of DCT Blocks with Block-Adaptive Scanning." IEICE Transactions on Communications, No. 12, Dec. 1994, 6 pp.

Kim et al., "Efficient entropy coding scheme for H.264/AVC lossless video coding," Elsevier, Image Communication, Apr. 24, 2010, 10 pp.

Marpe et al., "Context-Based Adaptive Binary Arithmetic Coding in the H.264/AVC Video Compression Standard", IEEE Transactions on Circuits and Systems for Video Technology, vol. 13, No. 7, Jul. 2003, 17 pp.

McCann et al., "Samsung's Response to the Call for Proposals on Video Compression Technology," Joint Collaborative Team on Video, Document: JCTVC-A124, Apr. 15-23, 2010, 42 pp.

Schaar-Mitrea et al., "Novel Embedded Compression Algorithm for Memory Reduction in MPEG codecs" Conference on Visual Communications and Image Processing, SPIE, Jan. 1999, 10 pp.

(56) References Cited

OTHER PUBLICATIONS

Min et al., "Adaptive significance map coding for large transform", Joint Collaborative Team on Video Coding, JCTVC-F598, Jul. 14-22, 2011, 3 pp.

Misra et al., "A Memory Efficient Method for Fast Transposing Run-length Encoded Images", Proceedings of the Fifth International Conference on Document Analysis and Recognition, IEEE, Sep. 1999, 4 pp.

Nguyen et al, "Improved Context Modeling for Coding Quantized Transform Coefficients in Video Compression", Picture Coding Symposium, IEEE, Dec. 8-10, 2010, 4 pp.

Puri et al., "Improvements in DCT Based Video Coding", Proceedings of SPIE, vol. 3024, Feb. 12, 1997, 13 pp.

Seregin et al. "Low-complexity adaptive coefficients scanning", Joint Collaborative Team on Video Coding, JCTVC-C205v3, Oct. 7-15, 2010, 4 pp.

Shim et al., "Adaptive Scanning Patterns for Intra Prediction", International Telecommunication Union Telecommunications Standardization Sector, VCEG-AH14, Jan. 12-13, 2008, 8 pp.

Sole Rojals et al., "Parallel Context Processing for the significance map in high coding efficiency", Joint Collaborative Team on Video Coding, JCTVC-D262, Jan. 20-28, 2011, 4 pp.

Sole Rojals et al, "Unified scans for the significance map and coefficient level coding in high coding efficiency", Joint Collaborative Team on Video Coding, JCTVC-E335, Mar. 16-23, 2011, 4 pp.

Sole Rojals et al. "Parallel Context Processing for the significance map in high coding efficiency", Joint Collaborative Team on Video Coding, JCTVC-D262 PowerPoint, Jan. 20-28, 2011, 8 pp.

Davies, "Unified scan processing for high efficiency coefficient coding", Joint Collaborative Team on Video Coding, JCTVC-D219, Jan. 20-28, 2011, 5 pp.

U.S. Appl. No. 13/413,472, by Joel Sole Rojals, filed on Mar. 6, 2012.
U.S. Appl. No. 13/413,497, by Joel Sole Rojals, filed on Mar. 6, 2012.
U.S. Appl. No. 13/413,514, by Joel Sole Rojals, filed on Mar. 6, 2012.
U.S. Appl. No. 13/413,526, by Joel Sole Rojals, filed on Mar. 6, 2012.
U.S. Appl. No. 13/534,332, by Joel Sole Rojals, filed on Jun. 27, 2012.

Wiegand et al., "WD3: Working Draft 3 of High-Efficiency Video Coding," Joint Collaborative Team on Video Coding, Document: JCTVC-E603, Mar. 16-23, 2011,193 pp.

Winken et al., "Video Coding Technology Proposal by Fraunhofer HHI", Joint Collaborative Team on Video Coding, JCTVC-A116 PowerPoint, Apr. 24, 2010, 28 pp.

Winken et al., "Video coding technology proposal by Fraunhofer HHI", Joint Collaborative Team on Video Coding, Document: JCTVC-A116, Apr. 15-23, 2010, 44 pp.

Ye et al., "Improved intra coding", International Telecommunication Union Telecommunications Standardization Sector, VCEG-AG11, Oct. 20, 2007, 6 pp.

Yu et al., "Probability Modeling for Encoding Quantized Transform Coefficients", 25. Picture Coding Symposium, IEEE, Apr. 24, 2006, 6 pp.

Zhang et al., "Context-Based Entropy Coding in AVS Video Coding Standard", Signal Processing: Image Communication, Elsevier Science Publishers, vol. 24, No. 4, Jun. 2, 2008, 14 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Budagavi et al.,"Parallel context processing techniques for high coding efficiency entropy coding in HEVC", JCT-VC Meeting; Jul. 21, 2010-Jul. 28, 2010; Geneva; (Joint Collaborativeteam on Video Coding of ISO/IEC JTCI/SC29/WGII and ITU-T SG.16); URL: http://wftp3.itu.int/av-arch/jctvc-site/3 No. JCTVC-B088, XP030007668, ISSN: 0000-0046, 11 pp.

International Search Report and Written Opinion—PCT/US2012/044633—ISA/EPO—Sep. 24, 2012, 14 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Sole Rojas et al., "CE11: Unified scans for the significance map and coefficient level coding in high efficiency", JCTVC-F288, Joint Collaborative Team on Video Coding (JCT-VC) of ITU-T SG16 WP3 and ISO/IEC JTC1/SC29/WG11, 6th Meeting: Torino (Italy), Jul. 14-22, 2011, 9 pp.

Joshi, et al., "CE7: Mode dependent intra residual coding ", MPEG Meeting; Mar. 21, 2011-Mar. 25, 2011; Geneva; (Motion Picture Expert Group or ISO/IEC JTC1/SC29/WG11),No. m19613, XP030048180, 9 pp.

Marpe et al., "Unified PIPE-Based Entropy Coding for HEVC", JCT-VC Meeting; MPEG Meeting; Jul. 14, 2011-Jul. 22, 2011; Torino; (Joint Collaborative Team on Video Coding of ISO/IEC JTC1/SC29/WG11 and ITU-T SG.16);URL:Http://wftp3.itu.int/av-arch/jctvc-site/,No. JCTVC-F268, XP030009291, 16 pp.

Nguyen et al., "Context Set Selection for Coefficient Level Coding", JCT-VC Meeting; MPEG Meeting; Jan. 2, 2012-Oct. 2, 2012; San Jose; (Joint Collaborative Team on Video Coding of ISO/I EC JTCI/SC29/WGII and ITU-T SG.16 ) ; URL: http://wftp3.itu.int/av-arch/jctvc-site/, No. JCTVC-H0404, XP030111431, 8 pp.

Nguyen, et al., "Reduced-complexity entropy coding of transform coefficient levels using a combination of VLC and PIPE", 95. MPEG Meeting; Jan. 24, 2011-Jan. 28, 2011;Daegu; (Motion Picture Expert Group or ISO/IEC JTC1/SC29/WG11),No. m19102, XP030047669, 9 pp.

Second Written Opinion of international application No. PCT/US2011/062700, dated Nov. 27, 2012, 14 pp.

Sole Rojas, et al., "CE11: Parallel Context Processing for the significance map in high coding efficiency", MPEG Meeting; Mar. 21, 2011-Mar. 25, 2011; Geneva; (Motion Picture Expert Group or ISO/IEC JTC1/SC29/WG11), No. m19866, XP030048433, 5 pp.

Sole Rojas, et al., "CE11: Removal of the parsing dependency of residual coding on intra mode", MPEG Meeting; Nov. 28, 2011-Feb. 12, 2011; Geneva; (Motion Picture Expert Group or ISO/IEC JTC1/SC29/WG11),No. m21883, XP030050446, 6 pp.

Sole Rojas, et al., "Parallel Context Processing for the significance map in high coding efficiency ", MPEG Meeting; Jan. 24, 2011-Jan. 28, 2011; Daegu; (Motion Picture Expert Group or ISO/IEC JTC1/SC29/WG11) No. m19026, XP030047594, 4 pp.

Sole Rojas, et al.,"Parallel processing of residual data in HE", JCT-VC Meeting; MPEG Meeting; Jul. 14, 2011-Jul. 22, 2011; Torino; (Joint Collaborative Team on Video Coding of ISO / IEC JTCI/SC29/WGII and ITU-T SG. 16) ; URL: http://wftp3.itu.int/av-arch/jctvc-site/, No. JCTVC-F552, XP03000957, 3 pp.

Sole Rojas, et al., "Removal of the parsing dependency of residual coding on intra mode", JCT-VC Meeting; MPEG Meeting; Jul. 14, 2011-Jul. 22, 2011; Torino; (Joint Collaborative Team on Video Coding of ISO/IEC JTC1/SC29/WG11 and ITU-T SG.16 ); URL:http://wftp3.itu.int/av-arch/jctvc-site/,No. JCTVC-F550, XP030009573, 3 pp.

Sole Rojas, et al.,"CE11: Scanning Passes o f Residual Data in HE", JCT-VC Meeting; MPEG Meeting; Nov. 21, 2011-Nov. 30. 2011; Geneva; (Joint Collaborative Team on Video Coding of ISO / IEC JTCI/SC29/WG11 and ITU-T SG. 16) ; URL: http://wftp3. itu. int/av-arch/jctvc-site/ No. JCTVC-G320, XP030110304, 3 pp.

Sze: CE11: Coding efficiency of tools i n HHI Transform—Coding (JCTVC-A116), MPEG Meeting; Jan. 24, 2011-Jan. 28, 2011; Daegu; (Motion Picture Expert Group or ISO / IEC JTCI/SC29/WGII), No. m18949, XP030047518, 8 pp.

Sze, et al., "Parallel Context Processing of Coefficient Level", JCT-VC Meeting; MPEG Meeting; Jul. 14, 2011-Jul. 22, 2011; Torino; (Joint Collaborative Team on Video Coding of ISO/IEC JTC1/SC29/

(56) References Cited

OTHER PUBLICATIONS

WG11 and ITU-T SG.16 );URL: http://wftp3.itu.int/av-arch/jctvc-site/, No. JCTVC-F130, XP030009153, 4 pp.

U.S. Appl. No. 13/565,621, by Sole Rojals, et al., filed on Aug. 2, 2012.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD1: Working Draft 1 of High-Efficiency Video Coding", JCTVC-C403, 3rd Meeting: Guangzhou, CN, Oct. 7-15, 2010, 137 pp.

Zhang, et al., "Non-CE1: On CABAC parsing throughput", JCT-VC Meeting; MPEG Meeting; Jan. 2, 2012-Oct. 2, 2012; San Jose; (Joint Collaborative Team on Video Coding of ISO/IEC JTC1/SC29/WG11 and ITU-T SG.16 ); URL: http://wftp3.itu.int/av-arch/jctvc-site/, No. JCTVC-H0533, XP030111560, 7 pp.

International Preliminary Report on Patentability from U.S. Patent Application No. PCT/US2012/044633, dated Aug. 23, 2013, 20 pp.

Response to Second Written Opinion dated Jun. 3, 2013, from International Application No. PCT/US2012/044633, filed Aug. 1, 2013, 25 pp.

Budagavi et al., "TE8: TI Parallel context processing (PCP) proposal," JCTVC-0062, Oct. 7-15, 2010, 7 pp.

ITU-T H.265, Series H: Audiovisual and Multimedia Systems, Infrastructure of audiovisual services—Coding of moving video, High efficiency video coding, The International Telecommunication Union, Apr. 2013, 317 pp.

Marpe et al., "Novel entropy coding concept," Document JCTVC-A032, 1st Meeting: Dresden, DE, Apr. 15-23, 2010, 17 pp.

Sasai, et al., "Simplified Context Modeling for Transform Coefficient Coding", Joint Collaborative Team on Video Coding (JCT-VC) of ITU-T SG16 WP3 and ISO/IEC JTC1/SC29/WG11 JCTVC-D185, Jan. 2011, 5 pp.

Seregin et al., "Low-complexity adaptive coefficients scanning", Joint Collaborative Team on Video Coding (JCT-VC) of ITU-T SG16 WP3 and ISO/IEC JTC1/SC29/WG11, vol. JCTVC-C205, Oct. 7-15, 2010, XP055012689, 4 pp.

Sze "Context selection complexity in HEVC CABAC", JCT-VC Meeting; MPEG Meeting; Jan. 20, 2011-Jan. 8, 2011; Daegu;(Joint Collaborative Team on Video Coding of ISO/IEC JTC1/SC29/WG11 AND ITU-T SG.16 ); URL: http://wftp3.itu.int/av-arch/jctvc-site/ No. JCTVC-D244, XP030008284, ISSN: 0000-0013, 3 pp.

Ye et al., "Improved H.264 Intra Coding Based on Bi-Directional Intra Prediction, Directional Transform, and Adaptive Coefficient Scanning," 2008, 4 pp.

Zheng et al., "Cell: Mode Dependent Coefficient Scanning", JCT-VC Meeting; MPEG Meeting; Jan. 20, 2011-Jan. 28, 2011; Daegu; (Joint Collaborative Team on Video Coding of ISO/IEC JTC1/SC29/WG11AND ITU-T SG.16); No. JCTVC-D393, XP030008432, ISSN: 0000-0013, URL: http://wftp3.itu.int/av-arch/jctvc-site, 4 pp.

International Preliminary Report on Patentability from International Application No. PCT/US2012/044633, dated Aug. 23, 2013, 7 pp.

* cited by examiner

| 6 | 2 | 1 | 0 |
|---|---|---|---|
| 3 | 3 | 0 | 0 |
| 1 | 0 | 0 | 0 |
| 0 | 0 | 0 | 0 |

FIG. 2

| 1 | 1 | 1 | 0 |
|---|---|---|---|
| 1 | 1 | 0 | 0 |
| 1 | 0 | 0 | 0 |
| 0 | 0 | 0 | 0 |

FIG. 4

DERIVATION OF THE POSITION IN SCAN ORDER OF THE LAST SIGNIFICANT TRANSFORM COEFFICIENT IN VIDEO CODING

This application claims the benefit of U.S. Provisional Application No. 61/502,269, filed Jun. 28, 2011, U.S. Provisional Application No. 61/503,529, filed Jun. 30, 2011, U.S. Provisional Application No. 61/550,775, filed Oct. 24, 2011, and U.S. Provisional Application No. 61/550,784, filed Oct. 24, 2011, the entire content of which are hereby incorporated by reference.

TECHNICAL FIELD

This disclosure relates to techniques for encoding and decoding video data. More particularly, this disclosure relates to signaling positions of significant transform coefficients that represent information in the video data.

BACKGROUND

Digital video capabilities may be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into blocks. Each block may be further partitioned. Blocks in an intra-coded (I) frame or slice are encoded using spatial prediction with respect to neighboring blocks. Blocks in an inter-coded (P or B) frame or slice may use spatial prediction with respect to neighboring blocks in the same frame or slice or temporal prediction with respect to other reference frames.

SUMMARY

This disclosure relates generally to techniques for signaling a position of a last significant coefficient (LSC) in a block of transform coefficients during video coding. For example, the techniques provide for a video decoder that receives a block-based LSC indicator for a LSC of a block of transform coefficients. The block-based LSC indicator indicates coordinates of the LSC when the block is scanned according to a scanning order. The video decoder converts the block-based LSC indicator to a scan-based LSC indicator. The scan-based LSC indicator indicates an ordinal position of the LSC according to the scanning order. The video decoder may then use the scan-based LSC indicator to decode a significance map.

In one example, this disclosure describes a method for decoding video data. The method comprises converting a block-based LSC indicator into a scan-based LSC indicator. The block-based LSC indicator indicates coordinates of a last significant coefficient of a block of transform coefficients according to a scanning order. The scan-based LSC indicator indicates an ordinal position of the LSC according to the scanning order. The method also comprises decoding, based on the scan-based LSC indicator, a significance map for the block.

In another example, this disclosure describes a video decoding device comprising one or more processors configured to convert a block-based LSC indicator into a scan-based LSC indicator. The block-based LSC indicator indicates coordinates of a last significant coefficient of a block of transform coefficients according to a scanning order. The scan-based LSC indicator indicates an ordinal position of the LSC according to the scanning order. The one or more processors are also configured to decode, based on the scan-based LSC indicator, a significance map for the block.

In another example, this disclosure describes a video decoding device comprising means for converting a block-based LSC indicator into a scan-based LSC indicator. The block-based LSC indicator indicates coordinates of a last significant coefficient of a block of transform coefficients according to a scanning order. The scan-based LSC indicator indicates an ordinal position of the LSC according to the scanning order. The video decoding device also comprises means for decoding, based on the scan-based LSC indicator, a significance map for the block.

In another example, this disclosure describes computer program product that comprises a computer-readable storage medium having instructions stored thereon that configure one or more processors to convert a block-based LSC indicator into a scan-based LSC indicator. The block-based LSC indicator indicates coordinates of a last significant coefficient of a block of transform coefficients according to a scanning order. The scan-based LSC indicator indicates an ordinal position of the LSC according to the scanning order. The instructions also configure the one or more processors to decode, based on the scan-based LSC indicator, a significance map for the block.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

FIG. 2 is a conceptual diagram that illustrates an example transform coefficient block.

Figure 4:
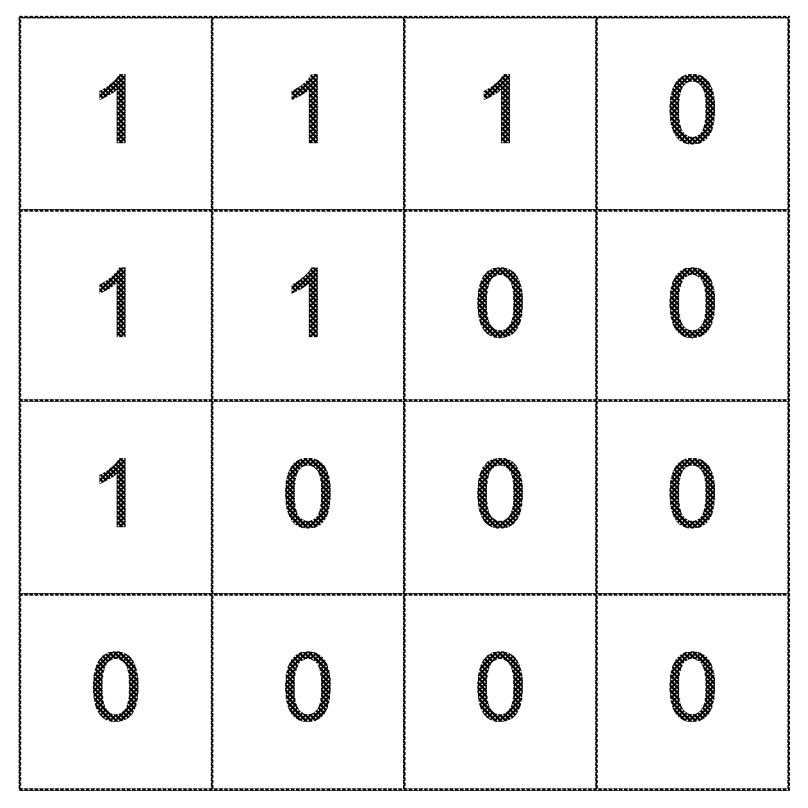

FIG. 4 is a conceptual diagram that illustrates a two-dimensional representation of an example significance map for the transform coefficient block of FIG. 2.

DETAILED DESCRIPTION

Figure 1:
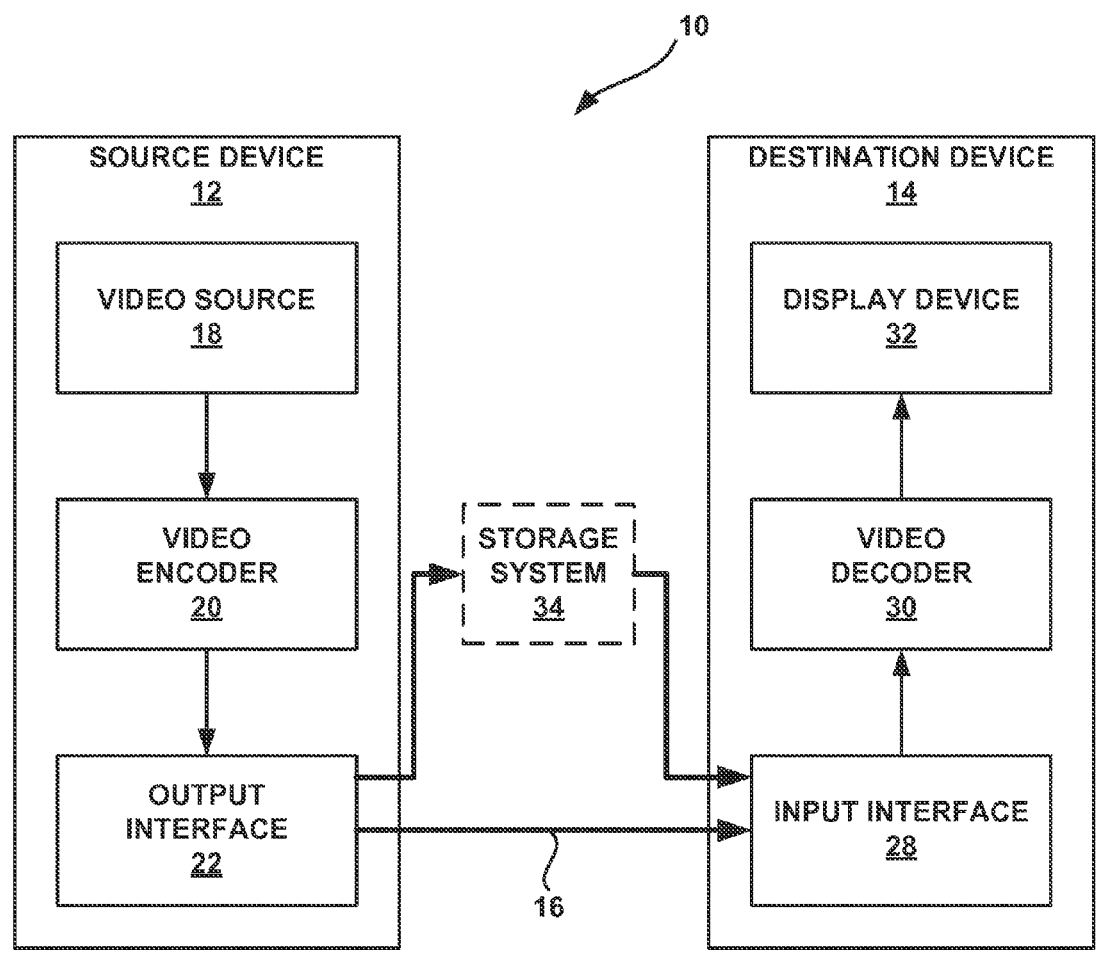
FIG. 1 is a block diagram that illustrates an example video coding system.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

As described below, a video encoder may generate transform coefficient blocks. Each of the transform coefficient blocks may be a two-dimensional array of transform coefficients. After the video encoder generates a transform coefficient block, the video encoder may identify a last significant coefficient (LSC) of the transform coefficient block according to the scanning order. In other words, when the transform coefficients of the transform coefficient block are sequenced according to the scanning order, the LSC of the transform coefficient block is the last non-zero transform coefficient. The scanning order may start at a DC transform coefficient (i.e., the top-left transform coefficient) of the transform coefficient block.

The video encoder may output a scan-based LSC indicator that indicates an ordinal position of the LSC according to the scanning order. In other words, the video encoder may output a scan-based LSC indicator that indicates that the LSC is the n'th transform coefficient when the transform coefficients are sequenced according to the scanning order.

In some conventional video encoders, the video encoder may perform a series of coding passes on the transform coefficient block. During each of the coding passes, the video encoder may process the transform coefficients of the transform coefficient block according to the scanning order. During each of the coding passes, the video encoder encodes information about the transform coefficients.

During one of the coding passes, the video encoder generates a significance map. The significance map includes a series of significance flags that indicate whether transform coefficients in the transform coefficient block are significant (i.e., non-zero). To generate the significance map, the video encoder may process each of the transform coefficients according to the scanning order. When the video encoder processes a transform coefficient, the video encoder may determine whether the ordinal position of the transform coefficient occurs before the ordinal position of the LSC according to the scanning order. If so, the video encoder may generate a significance flag for the transform coefficient. The significance flag may have a value of "1" if the value of the transform coefficient is non-zero. The significance flag may have a value of "0" if the value of the transform coefficient is equal to zero. However, if the ordinal position of the transform coefficient does not occur before the ordinal position of the LSC according to the scanning order, the video encoder does not generate a significance flag for the transform coefficient.

A video decoder may receive the scan-based LSC indicator and the significance map of the transform coefficient block. The video decoder may then determine, based on the scan-based LSC indicator, whether the significance map includes significance flags for particular transform coefficients of the transform coefficient block. If the video encoder does not generate a significance flag for a transform coefficient, the video decoder may infer that the transform coefficient is not significant.

In some instances, the video encoder may generate a block-based LSC indicator that indicates the coordinates within the transform coefficient block of the LSC. The video encoder may then CABAC encode the block-based LSC indicator. Because of the statistical relationships between the x and y coordinates, it may require fewer bits to indicate the position of the LSC using the block-based LSC indicator than to indicate the position of the LSC in terms of the ordinal position of the LSC.

Furthermore, in some instances, it may require fewer bits to represent the significance map when the video encoder uses a reverse of the scanning order to generate the significance map rather than when the video encoder uses the scanning order to generate the significance map. However, if the video encoder generates a block-based LSC indicator and if the video encoder uses the reverse scanning order to generate the significance map, the video decoder may be unable to determine, based on the block-based LSC indicator, whether the ordinal position of a transform coefficient occurs before the ordinal position of LSC of the transform coefficient block. Consequently, the video decoder may be unable to determine, based on the block-based LSC indicator, whether the significance map includes significance flags for particular transform coefficients.

To address this problem, the video decoder may, in accordance with the techniques of this disclosure, perform a conversion operation that converts the block-based LSC indicator into a scan-based LSC indicator. The scan-based LSC indicator may indicate the ordinal position of the LSC according to the scanning order. The video decoder may then decode, based on the scan-based LSC indicator, the significance map for the block.

As described herein, the video decoder may convert the block-based LSC indicator into the scan-based LSC indicator in various ways. For example, the video decoder may perform a non-iterative algorithm to derive the scan-based LSC indicator from the block-based LSC indicator. In another example, the video decoder may convert the block-based LSC indicator into the scan-based LSC indicator at least in part by accessing a data structure that maps block-based LSC indicators to scan-based LSC indicators. In yet another example, the video decoder may perform a loop operation that scans through positions in a transform coefficient block according to the scanning order until a position having the coordinates of the block-based LSC indicator is reached. In this example, the video decoder may increment the scan-based LSC indicator for each position of the transform coefficient block prior to the position having the coordinates.

FIG. 1 is a block diagram that illustrates an example video coding system 10 that may utilize the techniques described in this disclosure. In this disclosure, the term "video coding" may refer to video encoding and video decoding. As shown in FIG. 1, video coding system 10 includes a source device 12 and a destination device 14. Source device 12 generates encoded video data. Destination device 14 may decode the encoded video data at a later time. Source device 12 and destination device 14 may comprise any of a wide range of devices, including desktop computers, notebook (i.e., laptop) computers, tablet computers, set-top boxes, mobile telephones, telephone handsets, "smart" pads, televisions, cameras, display devices, digital media players, video gaming consoles, video streaming devices, or types of computing devices capable of encoding and decoding video data.

Destination device 14 may receive the encoded video data via a channel 16. Channel 16 may comprise a medium or device capable of moving the encoded video data from source device 12 to destination device 14. In one example, channel 16 may comprise a communication medium that enables source device 12 to transmit encoded video data directly to destination device 14 in real-time. Source device 12 or another device may modulate the encoded video data according to a communication standard, such as a wireless communication protocol. The communication medium may comprise any wireless or wired communication medium, such as a radio frequency (RF) spectrum or one or more physical transmission lines. Channel 16 may form part of a packet-based network, such as a local area network, a wide-area network, or a global network such as the Internet. Channel 16 may include routers, switches, base stations, or any other equipment that may be useful to facilitate communication of the encoded video data from source device 12 to destination device 14.

In some examples, source device 12 and destination device 14 may be equipped for wireless communication. However, the techniques of this disclosure are not necessarily limited to wireless applications or settings. Rather, the techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, source device 12 and destination device 14 may be configured to support one-way or two-way video transmission to support applications such as video streaming, video playback, video broadcasting, and/or video telephony.

Furthermore, in some examples, source device 12 may output the encoded video data to a storage system 34. Similarly, destination device 14 may access encoded video data stored on storage system 34. In various examples, storage system 34 may include various distributed or locally accessed data storage media. Example types of data storage media include, but are not limited, to hard drives, Blu-ray discs, DVDs, CD-ROMs, solid state memory units, volatile or non-volatile memory, or other digital storage media suitable for storing encoded video data.

In some examples, storage system 34 may comprise a file server or another intermediate storage device that may hold the encoded video generated by source device 12. Destination device 14 may access stored video data from storage system 34 via streaming or download. The file server may be any type of server capable of storing encoded video data and transmitting that encoded video data to destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage system 34 may be a streaming transmission, a download transmission, or a combination of both.

In the example of FIG. 1, source device 12 includes a video source 18, a video encoder 20 and an output interface 22. In some examples, output interface 22 may also include a modulator/demodulator (modem) and/or a transmitter. Video source 18 provides video data to video encoder 20. In various examples, video source 18 may comprise various types of devices and/or systems for providing video data. For example, video source 18 may comprise a video capture device, such as a video camera. In another example, video source 18 may comprise a video archive that contains previously captured video. In yet another example, video source 18 may comprise a video feed interface that receives video from a video content provider. In yet another example, video source 18 may comprise a computer graphics system for generating computer graphics data.

As described in detail below, video encoder 20 may encode the video data provided by video source 18. In some examples, source device 12 may transmit the encoded video data directly to destination device 14 via output interface 22. Moreover, in some examples, storage system 34 may store the encoded video data for later access by destination device 14 or other devices.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage system 34) prior to being received and decoded by video decoder 30. Thus, the term "signaling" may generally refer to the communication of syntax or other data used to decode the compressed video data. Such communication may occur in real- or near-real-time. Alternately, such communication may occur over a span of time, such as might occur when storing syntax elements to a medium at the time of encoding, which then may be retrieved by a decoding device at any time after being stored to this medium.

In the example of FIG. 1, destination device 14 includes an input interface 28, a video decoder 30, and a display device 32. In some examples, input interface 28 may include a receiver and/or a modem. Input interface 28 of destination device 14 receives encoded video data from channel 16 and/or storage system 34. Video decoder 30 decodes the encoded video data received by input interface 28. Destination device 14 may render the decoded video data for display on display device 32.

Display device 32 may be integrated with or may be external to destination device 14. In some examples, destination device 14 may include an integrated display device and also be configured to interface with an external display device. In various examples, display device 32 may comprise various types of display devices. For example, display device 32 may comprise a liquid crystal display (LCD), a plasma display, an organic light emitting diode (OLED) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. Example extensions to standards include the scalable video coding (SVC) and Multiview Video Coding (MVC) extensions to the H.264/AVC standard. The techniques of this disclosure are not limited to any particular coding standard. Other examples of video compression standards include MPEG-2 and ITU-T H.263.

As mentioned briefly above, video encoder 20 encodes video data. The video data may comprise one or more sequences of pictures. Each of the pictures is a still image. In some instances, a picture may be referred to as a "frame." When video encoder 20 encodes the video data, video encoder 20 may generate a bitstream. The bitstream includes a sequence of bits that form a representation of coded pictures and associated data. A coded picture is a coded representation of a picture.

To generate the bitstream, video encoder 20 may perform an encoding operation for sequences of pictures in the video data. When video encoder 20 performs the encoding operation for a sequence of pictures, video encoder 20 may generate a series of coded pictures and associated data. In addition, video encoder 20 may generate a sequence parameter set that contains parameters applicable to zero or more sequences of pictures. Furthermore, video encoder 20 may generate picture parameter sets (PPSs) that contain parameters applicable to zero or more pictures as a whole. In some examples, video encoder 20 may generate adaptation parameter sets (APSs). The APS may store parameters applicable to zero or more picture as a whole.

To generate a coded picture, video encoder 20 may partition a picture into one or more equally-sized video blocks. Each of the video blocks may be associated with a treeblock. A video block may be a two-dimensional (2D) block of video data (e.g., samples). In some instances, a treeblock may also be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs).

In some examples, video encoder 20 may partition a picture into a plurality of slices. Each of the slices may include an integer number of CUs. In some instances, a slice comprises an integer number of treeblocks. In other instances, a boundary of a slice may be within a treeblock. If the boundary of a slice is within a treeblock, the slice may be referred to as a fine granular slice. In some examples, video encoder 20 may encode slices according to the size in bytes of the slices or according to the number of treeblocks in the slices.

As part of performing an encoding operation for a picture, video encoder 20 may perform encoding operations for each slice of the picture. The encoding operation for a slice may generate encoded data associated with the slice. The encoded data associated with the slice may be referred to as a "coded slice." The coded slice may include a slice header and slice data. The slice data may include a series of successive coding units in coding order. The slice header may contain data elements pertaining to the first or all treeblocks of the slice.

To generate the coded slice data for a slice, video encoder 20 may perform encoding operations on each treeblock in the slice. When video encoder 20 performs the encoding operation on a treeblock, video encoder 20 may generate a coded treeblock. The coded treeblock may comprise data representing an encoded version of the treeblock.

To generate a coded treeblock, video encoder 20 may recursively perform quadtree partitioning on the video block of a treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. One or more syntax elements in the bitstream may indicate a maximum number of times video encoder 20 may partition a video block of a treeblock. The syntax elements may also indicate a smallest coding unit (SCU). A video block of a CU may be square in shape.

Video encoder 20 may perform encoding operations on each non-partitioned CU in a treeblock. As part of performing an encoding operation on a non-partitioned CU, video encoder 20 may generate one or more prediction units (PUs) for the CU. Each of the PUs of the CU may be associated with a different video block within the video block of the CU. Video encoder 20 may use intra prediction or inter prediction to generate prediction data for the PUs of the CU. When video encoder 20 uses intra prediction to generate the prediction data for a PU, video encoder 20 derives the prediction data for the PU from decoded samples of the picture that contains the PU. When video encoder 20 uses inter prediction to generate the prediction data for the PU, video encoder 20 derives the prediction data for the PU from decoded values of reference pictures other than the picture that contains the CU. The prediction data for a PU may include a predicted video block and various syntax elements.

After video encoder 20 generates prediction data for a CU, video encoder 20 may generate residual data for the CU. The residual data for the CU may indicate differences between samples in the predicted video blocks for the PUs of the CU and the samples in the original video block of the CU.

Figure 2:
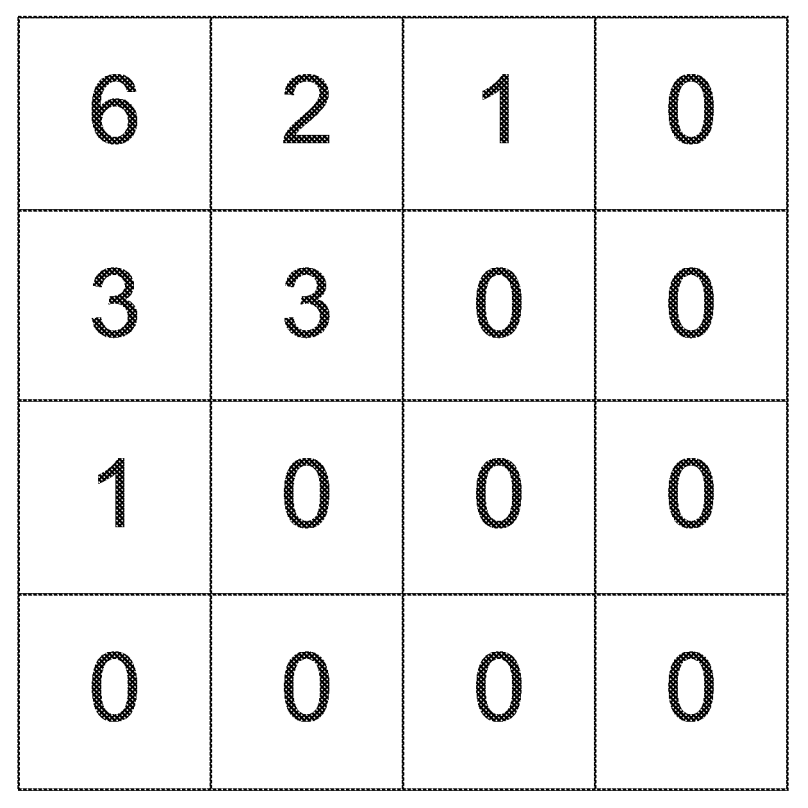

Each non-partitioned CU of a treeblock may have one or more transform units (TUs). Each TU of a CU may be associated with a different portion of the residual data of the CU. Video encoder 20 may perform a transform operation for each TU of the CU. When video encoder 20 performs the transform operation for a TU, video encoder 20 may generate a transform coefficient block at least in part by applying a transform to residual data associated with the TU. The transform coefficient block may be a 2D matrix of transform coefficients. FIG. 2 is a conceptual diagram that illustrates an example transform coefficient block.

Video encoder 20 may quantize the transform coefficients in a transform coefficient block. Quantization generally refers to a process in which transform coefficients in a transform coefficient block are quantized to possibly reduce the amount of data used to represent the transform coefficients, providing further compression. Quantization may reduce the bit depth associated with some or all of the transform coefficients. For example, an n-bit value may be rounded down to an m-bit value during quantization, where n is greater than m.

After quantizing a transform coefficient block, video encoder 20 may generate a set of syntax elements associated with the transform coefficient block. Video encoder 20 may then perform Context Adaptive Binary Arithmetic Coding (CABAC) operations on some of these syntax elements. In other examples, video encoder 20 may perform other entropy coding operations on the syntax elements. For instance, video encoder 20 may perform context adaptive variable length coding (CAVLC) operations, syntax-based context-adaptive binary arithmetic coding (SBAC) operations, Probability Interval Partitioning Entropy (PIPE) coding operations, or another type of entropy encoding operation on the syntax elements associated with the transform coefficient block. Video encoder 20 may also perform CABAC operations on other syntax elements associated with the video data.

After video encoder 20 generates the syntax elements associated with the transform coefficient block and performs the CABAC operations, video encoder 20 may include the resulting data in a bitstream for the video data. The bitstream may include a sequence of bits that forms a representation of coded pictures and associated data.

The bitstream may comprise a sequence of network abstraction layer (NAL) units. Each of the NAL units may be a syntax structure containing an indication of a type of data in the NAL unit and bytes containing the data. For example, a NAL unit may contain data representing a PPS, an APS, a coded slice, supplemental enhancement information, an access unit delimiter, filler data, or another type of data. The data of a NAL unit may be in the form of a raw byte sequence payload (RBSP) interspersed with emulation prevention bits. A RBSP may be a syntax structure containing an integer number of bytes that is encapsulated within a NAL unit.

When video encoder 20 performs an entropy encoding operation on a transform coefficient block, video encoder 20 may determine whether there is at least one significant (i.e., non-zero) transform coefficient in the transform coefficient block. If there is at least one significant transform coefficient in the transform coefficient block, video encoder 20 may update a coded block flag (CBF) to indicate that the transform coefficient block includes at least one significant transform coefficient. If there are no significant transform coefficients in the transform coefficient block, video encoder 20 may update the CBF to indicate that the transform coefficient block does not include any significant transform coefficients.

If there is at least one significant transform coefficient in the transform coefficient block, video encoder 20 may identify a last significant coefficient (LSC) of the transform coefficient block according to a scanning order. The LSC of the transform coefficient block is the non-zero transform coefficient that occurs last when the transform coefficients of the transform coefficient block are sequenced according to the scanning order. The scanning order may be a forward scanning order. In other words, the scanning order may start at a DC transform coefficient of the transform coefficient block. The DC transform coefficient occurs at a top left corner of the transform coefficient block. In contrast, reverse or inverse scanning orders start at a bottom right transform coefficient of a transform coefficient block.

Video encoder 20 may identify the LSC of the transform coefficient block according to various scanning orders. For example, video encoder 20 may identify the LSC according to a zigzag scanning order, a horizontal scanning order, a vertical scanning order, a diagonal scanning order, or a sub-block scanning order. In some examples, if the transform coefficient block is associated with an intra-predicted CU, video encoder 20 may select the scanning order based on an intra-prediction mode associated with the CU. Furthermore, in some examples, video encoder 20 may adaptively switch between scanning orders to optimize coding efficiency and/or subjective picture quality.

Figure 3:
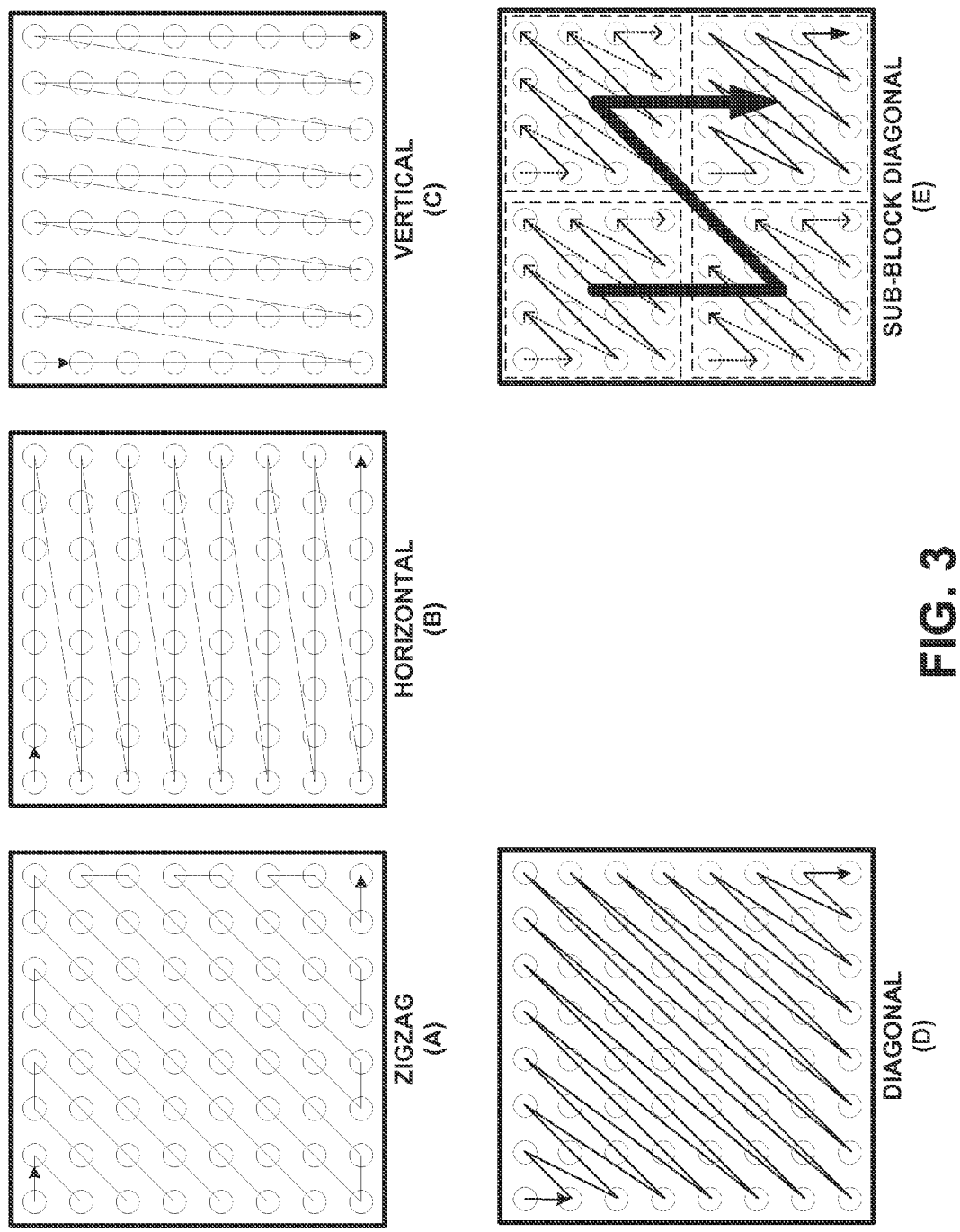
FIG. 3 is a conceptual diagram that illustrates example scanning orders.

FIG. 3 is a conceptual diagram that illustrates example scanning orders. Part (a) of FIG. 3 shows an example zigzag scanning order. Part (b) of FIG. 3 shows an example horizontal scanning order. Part (c) of FIG. 3 shows an example vertical scanning order. Part (d) of FIG. 3 shows an example reverse diagonal scanning order.

Part (e) of FIG. 3 shows an example diagonal sub-block scanning order. In a sub-block scanning order, video encoder 20 may split a large transform coefficient block into sub-blocks. In the example of FIG. 3, the sub-blocks are shown as dashed-line squares. For each of the sub-blocks, video encoder 20 may process the transform coefficients of the sub-block in a particular order. In the example of FIG. 3, video encoder 20 scans the transform coefficients in a upper-left sub-block in an up/right diagonal order, then scans the transform coefficients in a lower-left sub-block in the up/right diagonal order, then scans the transform coefficients in the upper-right sub-block in the up/right diagonal order, and finally scans the transform coefficients in the lower-right sub-block in the up/right diagonal order.

In other examples, video encoder 20 may partition the transform coefficient block into 4×4 sub-blocks (or other sub-block sizes). In this example, video encoder 20 may then process each of the 4×4 transform coefficient blocks according to the scanning order.

After identifying the LSC, video encoder 20 may generate a block-based LSC indicator. The block-based LSC indicator specifies the coordinates of the LSC. For example, if the transform coefficient block is 8×8, the scanning order is the horizontal scanning order, and video encoder 20 determines that the LSC occurs at the $10^{th}$ position when the transform coefficients of the transform coefficient block are sequenced according to the scanning order, video encoder 20 may generate a block-based LSC indicator specifying coordinates (1, 1).

Video encoder 20 may perform a CABAC encoding operation on the block-based LSC indicator. In some instances, performing the CABAC encoding operation on the block-based LSC indicator may be more efficient than performing the CABAC encoding operation on a corresponding scan-based LSC indicator because the entropy encoding operation may be able to exploit statistical relationships between the x-coordinate and the y-coordinate of the block-based LSC indicator. Video encoder 20 may add the CABAC encoded version of the block-based LSC indicator to the encoded bitstream.

After identifying the LSC, video encoder 20 may perform one or more coding passes on the transform coefficient block to generate and encode syntax elements associated with the transform coefficient block. The syntax elements associated with the transform coefficient block include a significance map for the transform coefficient block, and level information for the transform coefficients.

In each of the coding passes, video encoder 20 may scan through the transform coefficients of the transform coefficient block according to a reverse scanning order. The reverse scanning order may be a reverse of the scanning order used to identify the LSC. For example, if video encoder 20 identified the LSC according to a forward diagonal scanning order, the reverse scanning order may be a reverse diagonal scanning order.

For each transform coefficient processed during a first coding pass, video encoder 20 may determine whether the ordinal position of the transform coefficient occurs before the ordinal position of the LSC. If the ordinal position of the transform coefficient occurs before the ordinal position of the LSC, video encoder 20 may generate and CABAC encode a syntax element (i.e., a significance flag) that indicates whether the transform coefficient is significant. A transform coefficient may be "significant" if the transform coefficient is non-zero. If the transform coefficient does not occur before the ordinal position of the LSC, video encoder 20 does not generate or CABAC encode a significance flag for the transform coefficient. In this way, video encoder 20 may generate and CABAC encode a significance map for the transform coefficient block. After generating and CABAC encoding the significance map, video encoder 20 may include the CABAC encoded version of the significance map in the bitstream.

In some instances, there may be statistical relationships between the position of the LSC and the content of the significance map. Accordingly, video encoder 20 may use the position of the LSC to select one or more context models for use in CABAC encoding the significance flags of the significance map.

For each transform coefficient processed during a second coding pass, video encoder 20 may determine whether the transform coefficient is significant. If the transform coefficient is significant, video encoder 20 may generate and CABAC encode a syntax element (i.e., a level-greater-than-one flag) that indicates whether the absolute value of the transform coefficient is greater than one. If the transform coefficient is not significant, video encoder 20 does not generate or CABAC encode a level-greater-than-one flag for the transform coefficient. After generating and CABAC encoding the level-greater-than-one flags, video encoder 20 may include the CABAC encoded version of the level-greater-than-one flags in the bitstream.

During a third coding pass, video encoder 20 may generate and CABAC encode syntax elements indicating whether the absolute values of the transform coefficients are greater than two (i.e., level-greater-than-two flags). After generating and CABAC encoding the level-greater-than-two flags, video encoder 20 may include the CABAC encoded version of the level-greater-than-two flags in the bitstream.

For each transform coefficient processed during a fourth coding pass, video encoder 20 may determine whether the transform coefficient is significant. If the transform coefficient is significant, video encoder 20 may generate a syntax element (i.e., a sign flag) that indicates whether the transform coefficient is positive or negative. If the transform coefficient is not significant, video encoder 20 does not generate a sign flag for the transform coefficient. After generating the sign flags, video encoder 20 may include the sign flags in the bitstream.

For each transform coefficient processed during a fifth coding pass, video encoder 20 may determine whether the transform coefficient is significant. If the transform coefficient is significant, video encoder 20 may generate a remainder value for the coefficient (i.e., level-remainder elements). Video encoder 20 may then identify a Golomb-Rice code that corresponds to the remainder value. After identifying the Golomb-Rice code for the transform coefficient, video encoder 20 may include the Golomb-Rice code in the bitstream. If the transform coefficient is not significant, video encoder 20 does not generate a level-remainder element for the transform coefficient.

The syntax elements generated by the second, third, fourth, and fifth coding passes may constitute the level information of the transform coefficient block because the absolute values (i.e., levels) of the transform coefficients can be derived from these syntax elements.

When video decoder 30 receives a bitstream, video decoder 30 may perform a decoding operation that is generally reciprocal to the encoding operation performed by video encoder 20. For instance, video decoder 30 may perform a decoding operation on each slice of the picture. When video decoder 30 performs the decoding operation on a slice of the picture, video decoder 30 may perform decoding operations on the treeblocks in the slice. When video decoder 30 completes the decoding operation on a treeblock, video decoder 30 has decoded the samples in the video block associated with the treeblock. When video decoder 30 has decoded the samples for each treeblock of a slice, video decoder 30 has reconstructed the samples for the slice.

When video decoder 30 performs the decoding operation for a treeblock, video decoder 30 may perform a decoding operation for each non-partitioned CU within the treeblock. As discussed above, non-partitioned CUs may be partitioned into one or more TUs. Each of the TUs is associated with one or more transform coefficient blocks. In this disclosure, a TU is a "significant TU" if the transform coefficient block associated with the TU includes one or more significant transform coefficients.

When video decoder 30 performs a decoding operation on a non-partitioned CU, video decoder 30 may receive encoded level information for transform coefficient blocks associated with significant TUs of the CU, encoded significance maps for transform coefficient blocks associated with the significant TUs of the CU, and encoded block-based LSC indicators for the transform coefficient blocks associated with the significant TUs of the CU.

Because video encoder 20 does not generate significance flags for transform coefficients that occur after the ordinal position of the LSC according to the scanning order, video decoder 30 may be unable to determine which transform coefficients have significance flags until video decoder 30 is able to determine the ordinal position of the LSC. Moreover, because video encoder 20 does not generate level-greater-than-one flags, level-greater-than-two flags, sign flags, or level-remainder elements for non-significant coefficients, video decoder may be unable to determine which transform coefficients have level-greater-than-one flags, level-greater-than-two flags, sign flags, or level-remainder elements until video decoder 30 is able to determine the significance map.

Accordingly, video decoder 30 may first CABAC decode the block-based LSC indicator. In addition, video decoder 30 may convert the block-based LSC indicator into a scan-based LSC indicator. After the converting the block-based LSC indicator into the scan-based LSC indicator, video decoder 30 may decode, based on the scan-based LSC indicator, the significance map for the transform coefficient block. Video decoder 30 may then use the significance map to decode the level information of the transform coefficient block.

The scan-based LSC indicator indicates an ordinal position of the LSC according to the scanning order. The ordinal position of the LSC may be the relative position of the LSC in a sequence of transform coefficients formed by scanning the transform coefficient block according to the scanning order. For example, the transform coefficient block may be 8 transform coefficients by 8 transform coefficients and the block-based LSC indicator may specify the coordinates (1, 1). In this example, a transform coefficient at coordinates (1, 1) may be the $10^{th}$ transform coefficient when the transform coefficients are sequenced according to the horizontal scanning order. Hence, in this example, video decoder 30 may generate a scan-based LSC indicator indicating the $10^{th}$ position.

In accordance with the techniques of this disclosure, video decoder 30 may efficiently convert the block-based LSC indicator into the scan-based LSC indicator. Video decoder 30 may perform various operations to convert the block-based LSC indicator into the scan-based LSC indicator. For example, video decoder 30 may perform a non-iterative algorithm that derives the scan-based LSC indicator from the transform coordinates specified by the block-based LSC indicator. In another example, video decoder 30 may store a data structure that maps transform coordinates of block-based LSC indicators to scan-based LSC indicators. In this example, video decoder 30 may access this data structure to generate the scan-based LSC indicator.

In yet another example of how video decoder 30 may convert the block-based LSC indicator into the scan-based LSC indicator, video decoder 30 may generate the scan-based LSC indicator by performing a loop operation. In this example, an indicator may indicate a current transform coefficient of the given transform coefficient block. During each iteration of the loop operation, video decoder 30 may determine whether the current transform coefficient has the coordinates specified by the block-based LSC indicator. If not, video decoder 30 may increment the scan-based LSC indicator and update the indicator to indicate the next transform coefficient according to the scanning order. Thus, in this example, video decoder 30 may perform a loop operation that scans through positions in the given transform coefficient block according to the scanning order until a position having the coordinates is reached, incrementing the scan-based LSC indicator for each position of the given transform coefficient block prior to the position having the coordinates. In this example, the scanning order may be a sub-block scanning order in which the given transform coefficient is divided into sub-blocks. Video decoder 30 may scan through each of the transform coefficients in one of the sub-blocks before scanning through each of the transform coefficients in the next one of the sub-blocks.

In some examples, video decoder 30 may use different conversion operations based on different scanning orders. In other words, video decoder 30 may select a conversion operation based on a scanning order and use the selected conversion operation to convert a block-based LSC indicator to a scan-based LSC indicator. For example, video decoder 30 may use the non-iterative algorithm mentioned above when the scanning order is a reverse horizontal scanning order and video decoder 30 can use the mapping data structure mentioned above when the scanning order is a reverse diagonal scanning order.

In another example, video decoder 30 may use a combination of conversion operations. In this example, video decoder 30 may divide a transform coefficient block into sub-blocks. Video decoder 30 may use a non-iterative algorithm to identify the coordinates of the sub-blocks and the coordinates of the block-based LSC indicator within the sub-blocks. Video decoder 30 may then use another algorithm to determine the scanning order of the sub-blocks and a scanning order of the last significant transform coefficient within the sub-blocks. In this way, video decoder 30 may determine the scan-based LSC indicator.

Figure 5:
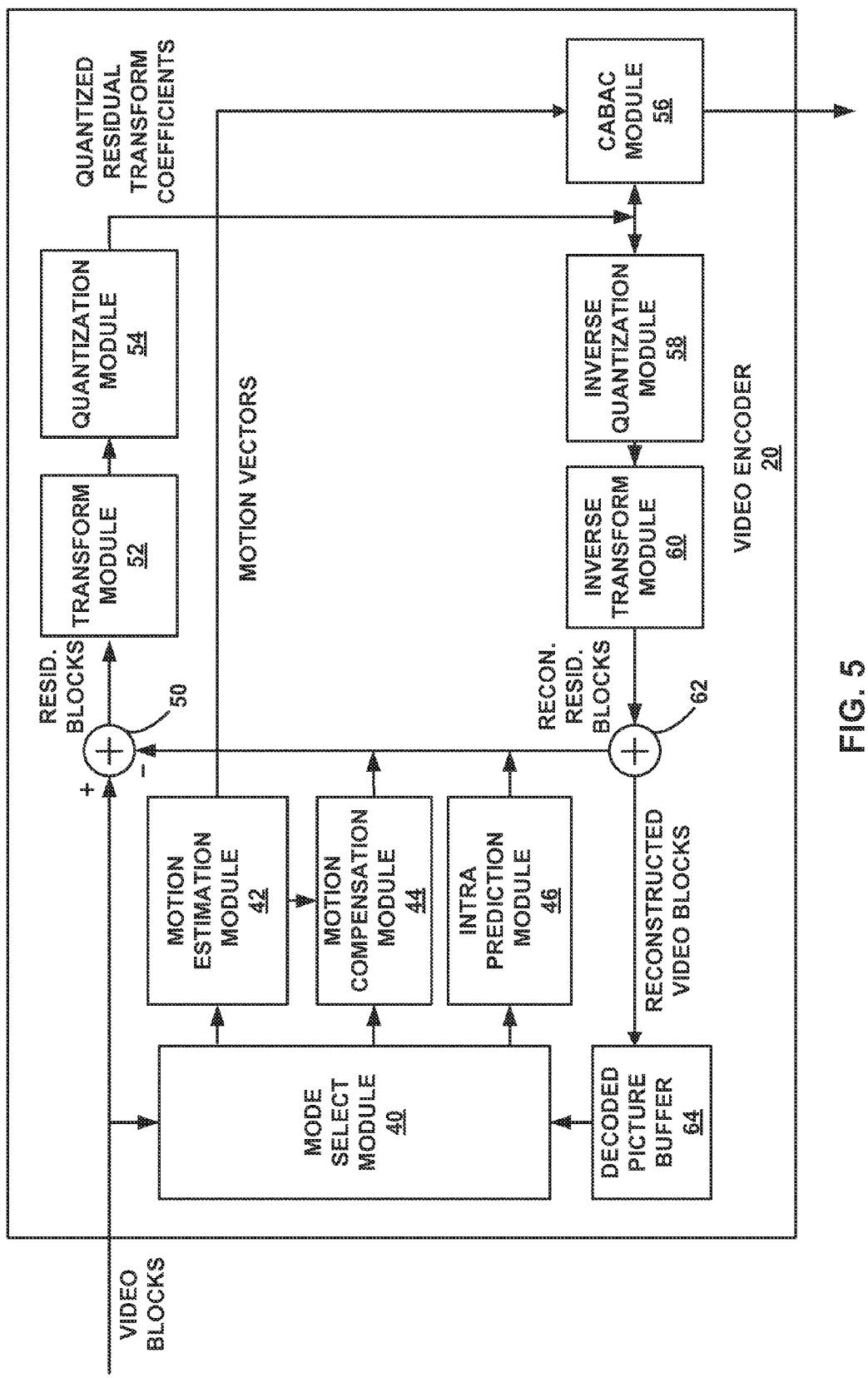
FIG. 5 is a block diagram that illustrates an example configuration of a video encoder.

FIG. 5 is a block diagram that illustrates an example configuration of video encoder 20 that is configured to implement the techniques of this disclosure. FIG. 5 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 5, video encoder 20 includes a plurality of functional components. The functional components of video encoder 20 include a mode select module 40, a motion estimation module 42, a motion compensation module 44, an intra-prediction module 46, a residual generation module 50, a transform module 52, a quantization module 54, a CABAC module 56, an inverse quantization module 58, an inverse transform module 60, a reconstruction module 62, and a decoded picture buffer 64. In other examples, video encoder 20 may include more, fewer, or different functional components. For example, video encoder 20 may include a deblocking filter module to filter the output of reconstruction module 62 to remove blockiness artifacts from reconstructed video. Furthermore, motion estimation module 42 and motion compensation module 44 may be highly integrated, but are represented in the example of FIG. 5 separately for purposes of explanation.

Video encoder 20 may receive video data. In various examples, video encoder 20 may receive the video data from various sources. For example, video encoder 20 may receive the video data from video source 18 (FIG. 1) or another source. The video data may represent sequences of pictures. To encode the video data, video encoder 20 may perform an encoding operation on each sequence of pictures.

As part of performing the encoding operation on a sequence of pictures, video encoder 20 may perform encoding operations on each picture within the sequence of pictures. As part of performing the encoding operation on a picture, video encoder 20 may perform encoding operations on each slice in the picture. As part of performing the encoding operation on a slice, video encoder 20 may perform an encoding operation on each treeblock in the slice.

As part of performing an encoding operation on a treeblock, video encoder 20 may partition the video block of the treeblock into one or more video blocks. Each of the video blocks may be associated with a different CU. In some examples, the sizes of the video blocks of the CUs may range from 8×8 pixels up to the size of the video block of the treeblock with a maximum of 64×64 pixels or greater. In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block has 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. Similar notation may be used to indicate dimensions of transform coefficient blocks.

As part of performing the encoding operation for a treeblock, video encoder 20 may generate a hierarchical quadtree data structure for the treeblock. For example, a treeblock may correspond to a root node of the quadtree data structure. If video encoder 20 partitions the video block of the treeblock into four sub-blocks, the root node has four child nodes in the quadtree data structure. The child nodes correspond to the CUs associated with the sub-blocks. If video encoder 20 partitions one of the sub-blocks into four sub-sub-blocks, the node corresponding to the CU associated with the sub-block may have four child nodes, which correspond to the CUs associated with the sub-sub-blocks.

Each node of the quadtree data structure may provide syntax data for the corresponding CU. For example, a node in the quadtree may include a split flag, indicating whether the video block of the CU corresponding to the node is partitioned (i.e., split) into four sub-blocks. Syntax elements for a CU may be defined recursively, and may depend on whether the video block of the CU is split into sub-blocks. A CU whose video block is not partitioned may correspond to a leaf node in the quadtree data structure. A leaf node in the quadtree data structure may be referred to as a "coding node." The data representing the encoded version of the treeblock may include data based on the quadtree data structure for the treeblock.

Video encoder 20 may perform encoding operations on each non-partitioned CU of the treeblock. When video encoder 20 performs the encoding operation on a non-partitioned CU, video encoder 20 generates data representing an encoded version of the non-partitioned CU.

As part of performing the encoding operation for a CU, motion estimation module 42 and motion compensation module 44 perform inter prediction on each PU of the CU. In other words, motion estimation module 42 and motion compensation module 44 may generate prediction data for each PU of the CU based on decoded samples of reference pictures other than the picture that contains the CU. Inter prediction may provide temporal compression.

Video encoder 20 and video decoder 30 may support various PU sizes. Assuming that the size of a particular CU is 2N×2N, video encoder 20 and video decoder 30 may support PU sizes of 2N×2N, N×N, 2N×N, or N×2N. Video encoder 20 and video decoder 30 may also support asymmetric partitioning for PU sizes of 2N×nU, 2N×nD, nL×2N, and nR×2N. In some examples, video encoder 20 may partition the video block of a CU among PUs of the CU along a boundary that does not meet the sides of the video block of the CU at right angles.

Motion estimation module 42 may perform a motion estimation operation with regard to each PU of the CU. When motion estimation module 42 performs a motion estimation operation with regard to a PU, motion estimation module 42 generates one or more motion vectors for the PU. For instance, slices may be I slices, P slices, or B slices. Motion estimation module 42 and motion compensation module 44 may perform different operations for a PU of a CU depending on whether the CU is in an I slice, a P slice, or a B slice. In an I slice, all CUs (and hence all PUs of the CUs) are intra predicted. Hence, if the PU is in an I slice, motion estimation module 42 and motion estimation module 44 do not perform inter prediction on the PU.

If the PU is in a P slice, the picture containing the PU is associated with a list of reference pictures referred to as "list 0." Each of the reference pictures in list 0 contains samples that may be used for inter prediction of subsequent pictures in decoding order. When motion estimation module 42 performs the motion estimation operation with regard to a PU in a P slice, motion estimation module 42 searches the reference pictures in list 0 for a reference sample for the PU. The reference sample of the PU may be a set of pixel values that most closely corresponds to the pixels values of the PU. Motion estimation module 42 may use a variety of metrics to determine how closely a set of pixel values in a reference picture corresponds to the pixel values of a PU. For example, motion estimation module 42 may determine how closely a set of pixel values in a reference picture corresponds to the pixel values of a PU by sum of absolute difference (SAD), sum of square difference (SSD), or other difference metrics.

After identifying a reference sample of a PU of a CU in a P slice, motion estimation module 42 may generate a reference index that indicates the reference picture in list 0 containing the reference sample and a motion vector that indicates a spatial displacement between the PU and the reference sample. In various examples, motion estimation module 42 may generate motion vectors to varying degrees of precision. For example, motion estimation module 42 may generate motion vectors at one-quarter pixel precision, one-eighth pixel precision, or other fractional pixel precision. Motion estimation module 42 may output the reference index and motion vector to CABAC module 56 and motion compensation module 44. Motion compensation module 44 may use the reference indexes and motion vectors of PUs of the CU to identify and retrieve the reference samples of the PUs. Motion compensation module 44 may then use pixel values of reference samples of PUs to generate the prediction data for the CU.

If the PU is in a B slice, the picture containing the PU may be associated with two lists of reference pictures, referred to as "list 0" and "list 1." Each of the reference pictures in list 0 contains samples that may be used for inter prediction of subsequent pictures in decoding order. The reference pictures in list 1 may occur before the picture in decoding order but after the picture in presentation order. In some examples, a picture containing a B slice may be associated with a list combination that is a combination of list 0 and list 1.

Furthermore, if the CU is in a B slice, motion estimation module 42 may perform uni-directional prediction or bi-directional prediction for PUs of the CU. When motion estimation module 42 performs uni-directional prediction for a PU, motion estimation module 42 may search the reference pictures of list 0 or list 1 for a reference sample for the PU. Motion estimation module 42 may then generate a reference index that indicates the reference picture in list 0 or list 1 that contains the reference sample and a motion vector that indicates a spatial displacement between the PU and the reference sample. Motion estimation module 42 may output the reference indexes and motion vectors for PUs of a CU to CABAC module 56 and motion compensation module 44. Motion compensation module 44 may use the reference indexes and motion vectors of PUs of the CU to identify and retrieve the reference samples of the PUs. Motion compensation module 44 may then use pixel values of reference samples of PUs to generate predicted video blocks for the PUs of the CU.

When motion estimation module 42 performs bi-directional prediction for a PU, motion estimation module 42 may search the reference pictures in list 0 for a reference sample for the PU and may also search the reference pictures in list 1 for another reference sample for the PU. Motion estimation module 42 may then generate reference indexes that indicate the reference samples and motion vectors that indicate spatial displacements between the reference samples and the PU. Motion estimation module 42 may output the reference indexes and motion vectors to CABAC module 56 and motion compensation module 44. Motion compensation module 44 may use the reference indexes and motion vectors to identify and retrieve the reference samples of the PUs. Motion compensation module 44 may then interpolate pixel values of the predicted video blocks of the PUs of the CU from pixel values in the reference samples of the PUs of the CU.

As part of performing an encoding operation on a CU, intra prediction module 46 may perform intra prediction on PUs of the CU. In other words, intra prediction module 46 may generate prediction data for the PUs of the CU based on decoded pixel values in the same slice as the CU. Intra prediction may provide spatial compression.

To perform intra prediction on a PU, intra prediction module 46 may use multiple intra prediction modes to generate multiple sets of prediction data for the PU. When intra prediction module 46 uses an intra prediction mode to generate a set of prediction data for a PU, intra prediction module 46 may extend pixel values from neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs and treeblocks. Intra prediction module 46 may use various numbers of intra prediction modes, e.g., 33 directional intra prediction modes, depending on the size of the PU.

Intra prediction module 46 may select one of the sets of prediction data for the PU. In various examples, intra prediction module 46 may select the set of prediction data for the PU in various ways. For example, intra prediction module 46 may select the set of prediction data for the PU by based on a comparison of distortion and bit rates for the sets of prediction data and selecting the set of prediction data that has the lowest distortion rate.

Mode select unit 40 may select the prediction data for the PUs of a CU from among the sets of prediction data generated by motion compensation module 44 for the PUs of the CU or the sets of prediction data generated by intra prediction unit 46 for the PUs of the CU. In some examples, mode select unit 40 selects the prediction data for the PUs of the CU based on error (i.e., distortion) and bit rates of the sets of prediction data.

After mode select unit 40 selects the prediction data for the PUs of a CU, residual generation module 50 may generate residual data for the CU by subtracting the pixel values of the predicted video blocks of the selected prediction data of the PUs of the CU from the pixel values of original video block of the CU. The residual data of a CU may include 2D residual blocks that correspond to different pixel components of the video blocks in the CU. For example, the residual data may include a residual video block that corresponds to differences between luminance components of pixels in the predicted video blocks of the CU and luminance components of pixels in the original video block of the CU. In addition, the residual data of the CU may include residual video blocks that correspond to the differences between chrominance components of pixels in the predicted video blocks of the PUs of the CU and the chrominance components of the pixels of the original video block of the CU.

As described above, a CU may have one or more TUs. Each TU of a CU may correspond to a different video block within the residual data of the CU. The sizes of the video blocks of the TUs of a CU may or may not be based on the sizes of the video blocks of the PUs of the CU. In some examples, the residual data of a CU may be subdivided into smaller video blocks using a quadtree structure known as "residual quad tree" (RQT). The TUs may correspond to the leaf nodes of the RQT.

Transform module 52 may generate transform coefficient blocks for each TU of a CU by applying a transform to residual video blocks corresponding to the TU. Each of the transform coefficient blocks may be a 2D matrix of transform coefficients. In various examples, transform module 52 may apply various transforms to a residual video block corresponding to a TU. For example, transform module may apply a discrete cosine transform (DCT), a directional transform, or a conceptually similar transform. After transform module 52 generates a transform coefficient block for a TU, quantization module 54 may quantize the transform coefficients in the transform coefficient block.

CABAC module 56 may receive a transform coefficient block from quantization module 54. When CABAC module 56 receives the transform coefficient block, CABAC module 56 may generate a significance map for the transform coefficient block and a block-based LSC indicator. The block-based LSC indicator may indicate the coordinates in the transform coefficient block of a last significant transform coefficient of the transform coefficient block. CABAC module 56 may also generate level information for the transform coefficient block. As explained above, the level information for the transform coefficient block may include a series of level-greater-than-one flags, a series of level-greater-than-two flags, a series of sign flags, and a series of level-remainder elements.

CABAC module 56 may perform CABAC encoding operations on the significance map, block-based LSC indicator, the level-greater-than-one flags, and the level-greater-than-two flags. In addition, CABAC module 56 may perform CABAC encoding operations on other syntax elements, such as motion vectors or motion vector difference information, and any of a variety of other syntax elements useful in decoding the video data at video decoder 30.

Inverse quantization module 58 and inverse transform module 60 may apply inverse quantization and inverse transformation to the transform coefficient block, respectively, to reconstruct a residual video block from the transform coefficient block. Reconstruction module 62 may add the reconstructed residual video block to pixel values of one or more predicted video blocks generated by motion compensation module 44 or intra prediction module 46 to produce a reconstructed video block for storage in decoded picture buffer 64. Motion estimation module 42 and motion compensation module 44 may use a reference picture that contains the reconstructed video block to perform intra or inter prediction on CUs of subsequent pictures.

Figure 6:
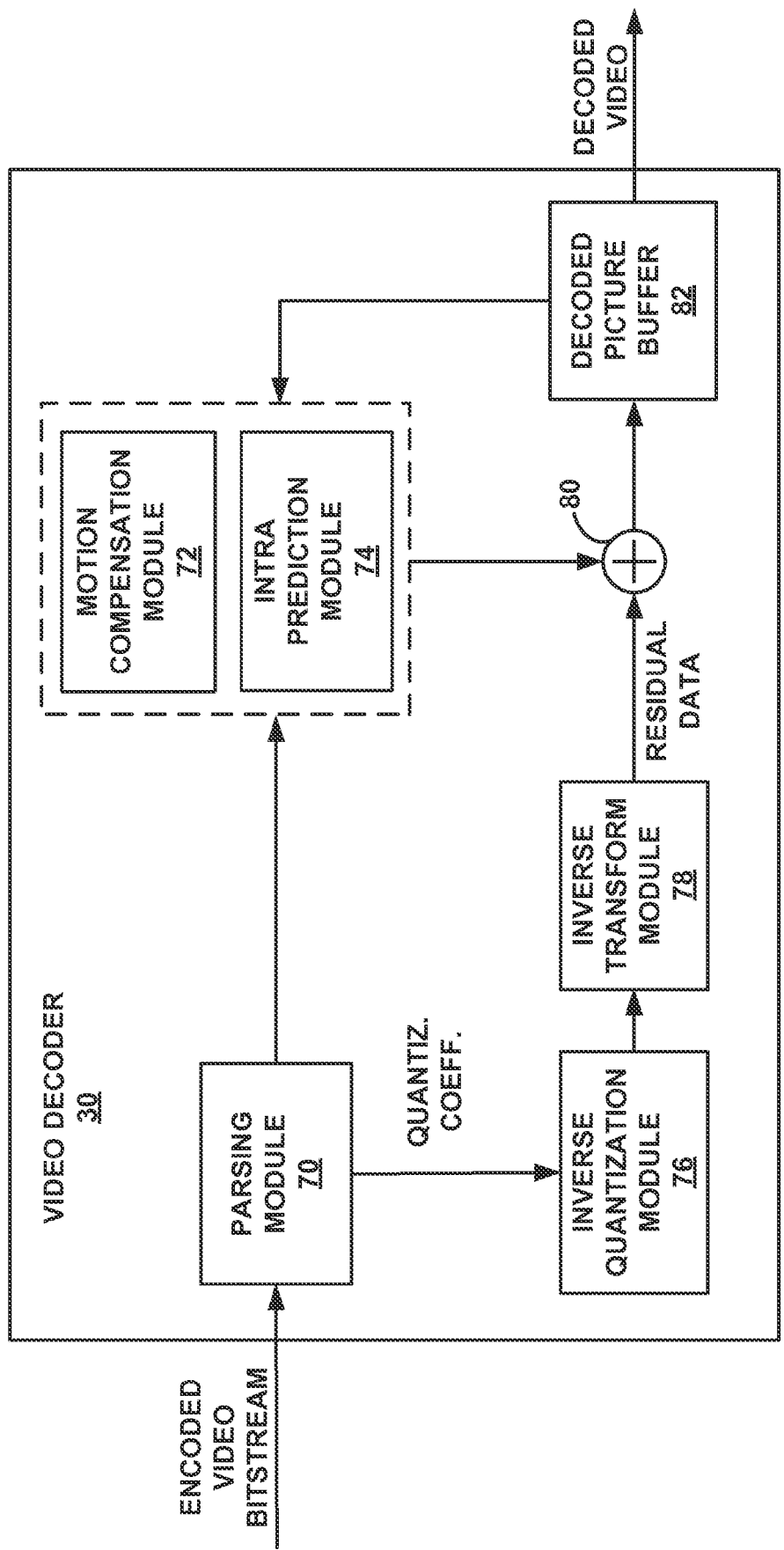
FIG. 6 is a block diagram that illustrates an example configuration of a video decoder.

FIG. 6 is a block diagram that illustrates an example configuration of video decoder 30. FIG. 6 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 6, video decoder 30 includes a plurality of functional components. The functional components of video decoder 30 include a parsing module 70, a motion compensation module 72, an intra prediction module 74, an inverse quantization module 76, an inverse transform module 78, a reconstruction module 80, and a decoded picture buffer 82. In some examples, video decoder 30 may perform a decoding pass generally reciprocal to the encoding pass described with respect to video encoder 20 of FIG. 5. In other examples, video decoder 30 may include more, fewer, or different functional components. For example, video decoder 30 may include a deblocking filter to filter the output of reconstruction module 80 to remove blockiness artifacts from reconstructed video.

Video decoder 30 may receive a bitstream that comprises encoded video data. The bitstream may include a plurality of syntax elements. When video decoder 30 receives the bitstream, parsing module 70 may perform a parsing operation on the bitstream. As a result of performing the parsing operation on the bitstream, parsing module 70 may extract the syntax elements from the bitstream. As part of performing the parsing operation, parsing module 70 may CABAC decode various CABAC encoded syntax elements in the bitstream. Motion compensation module 72, intra prediction module 74, inverse quantization module 76, and inverse transform module 78 may perform a reconstruction operation that generates decoded video data based on the syntax elements extracted from the bitstream.

The bitstream may include data that represent a block-based LSC indicator for a transform coefficient block, a significance map for the transform coefficient block, and level information for the transform coefficient block. As part of performing the parsing operation, parsing module 70 may CABAC decode the block-based LSC indicator. Parsing module 70 may then convert the block-based LSC indicator into a scan-based LSC indicator. The scanning order may be signaled in the encoded bitstream or may be inferred by parsing module 70 from one or more syntax elements or parameters.

After converting the block-based LSC indicator into the scan-based LSC indicator, parsing module 70 may use the scan-based LSC indicator to parse the significance map from the bitstream. For example, parsing module 70 may determine, based on the scan-based LSC indicator, whether the significance map for the transform coefficient block includes a significance flag for a transform coefficient. Furthermore, in some examples, parsing module 70 may select a context model based on the scan-based LSC indicator. Parsing module 70 may use the selected context model during a CABAC decoding operation that decodes the significance map. Parsing module 70 may use the significance map to parse the level information of the transform coefficient block from the bitstream.

Figure 9:
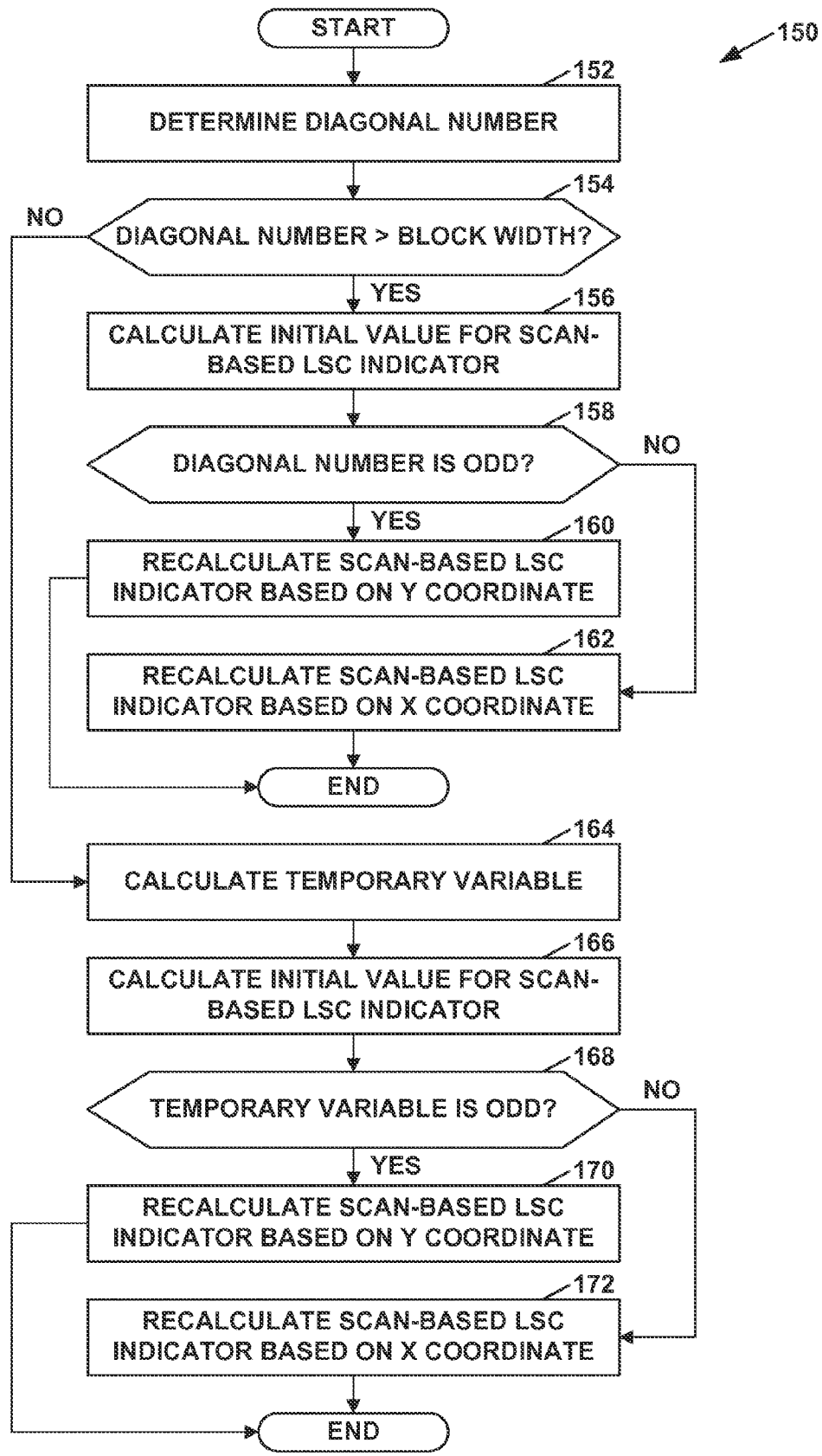
FIG. 9 is a flowchart that illustrates an example non-iterative operation to convert a block-based last significant coefficient (LSC) indicator into a scan-based LSC indicator.
Figure 10:
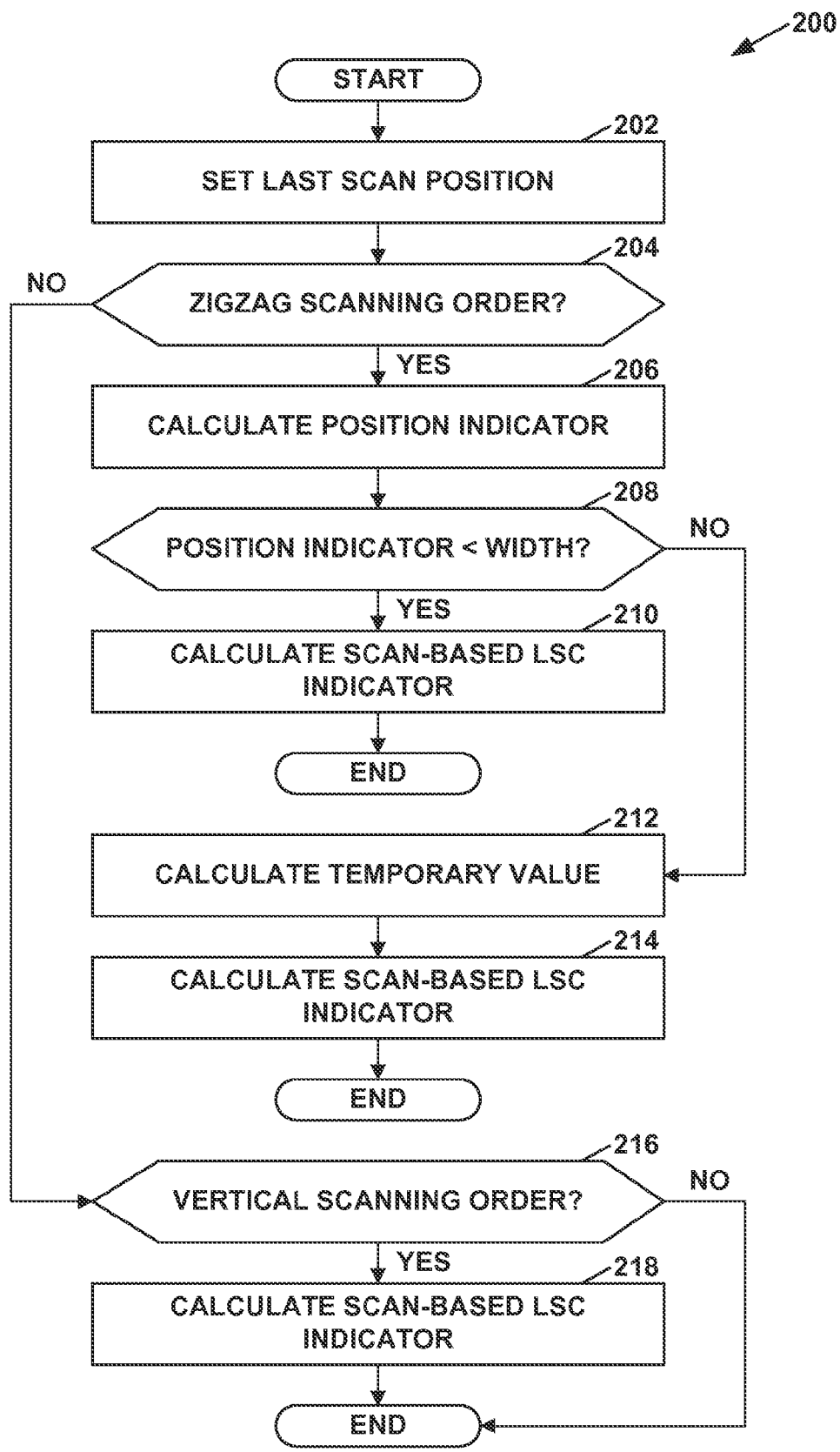
FIG. 10 is a flowchart that illustrates another example non-iterative operation to convert a block-based LSC indicator into a scan-based LSC indicator.
Figure 11:
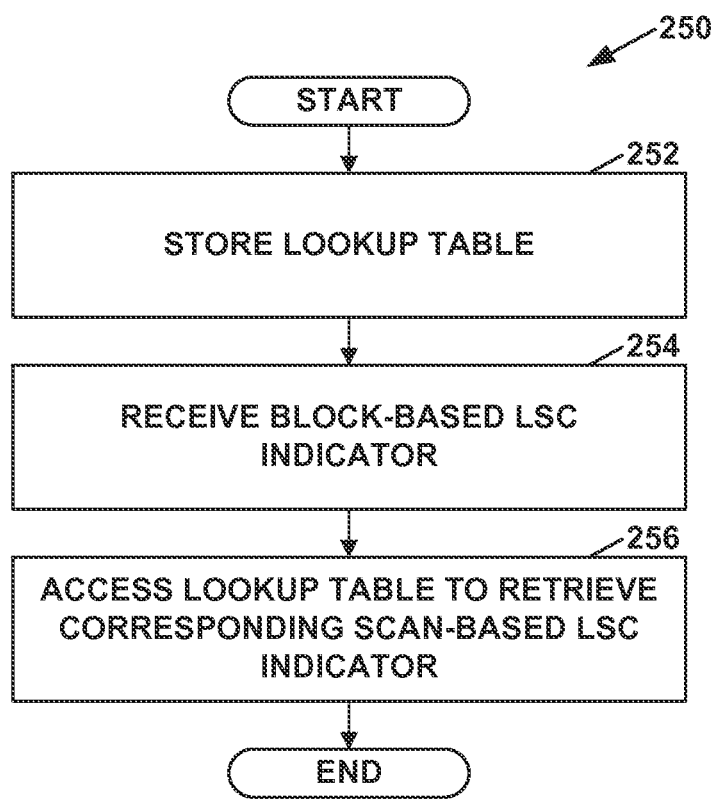
FIG. 11 is a flowchart that illustrates an example operation to convert a block-based LSC indicator into a scan-based LSC indicator in which a map data structure is accessed.
Figure 12:
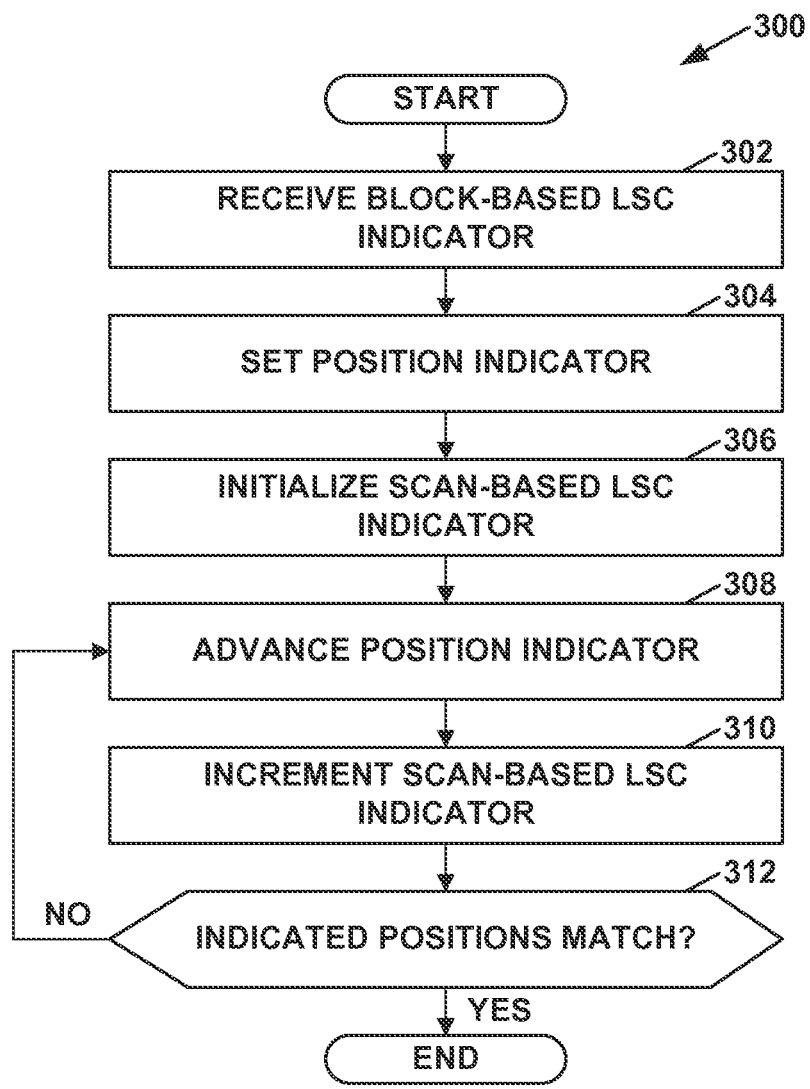
FIG. 12 is a flowchart that illustrates an example iterative operation to convert a block-based LSC indicator into a scan-based LSC indicator.

It may be desirable to convert the block-based LSC indicator into the scan-based LSC indicator in an efficient manner. In accordance with the techniques of this disclosure, parsing module 70 may perform various operations to convert the block-based LSC indicator into the scan-based LSC indicator. For example, parsing module 70 may perform a non-iterative algorithm that derives the scan-based LSC indicator from the coordinates specified by the block-based LSC indicator. FIGS. 9 and 10, described in detail below, are flowcharts of example non-iterative algorithms that may derive the scan-based LSC indicator from the coordinates specified by the block-based LSC indicator. In another example, parsing module 70 may store a data structure that maps coordinates to scan-based LSC indicators. In this example, parsing module 70 may access this data structure to generate the scan-based LSC indicator. FIG. 11, described in detail below, illustrates an example operation in which video decoder 30 converts the block-based LSC indicator to a scan-based LSC indicator at least in part by accessing a data structure that maps block-based LSC indicators to scan-based LSC indicators. In yet another example, parsing module 70 may generate the scan-based LSC indicator by performing a loop operation that scans through positions in a transform coefficient block according to a forward scanning order until a transform coefficient having the coordinates specified by the block-based LSC indicator is reached. FIG. 12, described in detail below, illustrates an example iterative operation in which video decoder 30 converts a block-based LSC indicator into a scan-based LSC indicator by performing such a loop operation.

In some examples, parsing module 70 may use different conversion operations based on different scanning orders. For instance, parsing module 70 may use the non-iterative algorithm mentioned above when the scanning order is a diagonal scanning order and parsing module 70 may use the mapping data structure mentioned above when the scanning order is a zigzag scanning order.

After parsing module 70 decodes transform coefficient block, inverse quantization module 76 may inverse quantize, i.e., de-quantize, the transform coefficient block. Inverse quantization module 76 may inverse quantize the transform coefficient block in a manner similar to the inverse quantization processes proposed for HEVC or defined by the H.264 decoding standard. Inverse quantization module 76 may use a quantization parameter QPY calculated by video encoder 20 for a CU of the transform coefficient block to determine a degree of quantization and, likewise, a degree of inverse quantization for inverse quantization module 76 to apply.

After inverse quantization module 76 inverse quantizes the transform coefficient block, inverse transform module 78 may generate a residual video block for the TU associated with the transform coefficient block. Inverse transform module 78 may generate the residual video block for the TU at least in part by applying an inverse transform to the transform coefficient block. For example, inverse transform module 78 may apply an inverse DCT, an inverse integer transform, an inverse Karhunen-Loeve transform (KLT), an inverse rotational transform, an inverse directional transform, or another inverse transform to the transform coefficient block. In some examples, inverse transform module 78 may determine an inverse transform to apply to the transform coefficient block based on signaling from video encoder 20. In such examples, inverse transform module 78 may determine the inverse transform based on a signaled transform at the root node of a quadtree for a treeblock associated with the transform coefficient block. In other examples, inverse transform module 78 may infer the inverse transform from one or more coding characteristics, such as block size, coding mode, or the like. In some examples, inverse transform module 78 may apply a cascaded inverse transform.

Motion compensation module 72 may perform motion compensation to generate prediction data for a PU of a CU. In some examples, motion compensation module 72 may refine the prediction data for a PU by performing interpolation based on interpolation filters. Identifiers for interpolation filters to be used for motion compensation with sub-pixel precision may be included in the syntax elements. Motion compensation module 72 may use the same interpolation filters used by video encoder 20 during generation of the prediction data of the PU to calculate interpolated values for sub-integer pixels of a reference block. Motion compensation module 72 may determine the interpolation filters used by video encoder 20 according to received syntax information and use the interpolation filters to produce prediction data.

Motion compensation module 72 and intra prediction module 74, in an HEVC example, may use some of the syntax information (e.g., provided by a quadtree) to determine sizes of treeblocks used to encode frame(s) of the encoded video sequence, split information that describes how video blocks of each CU of a frame of the encoded video sequence are split (and likewise, how sub-blocks are split), modes indicating how each PU is encoded (e.g., intra- or inter-prediction, and for intra-prediction an intra-prediction encoding mode), one or more reference frames (and/or reference lists containing identifiers for the reference frames) for each inter-predicted CU, and other information to decode the encoded video sequence.

Reconstruction module 80 combines the residual video blocks of a CU with the corresponding predicted video blocks of the PUs of the CU generated by motion compensation module 72 or intra prediction module 74 to form decoded video blocks. In some examples, video decoder 30 may apply a deblocking filter to filter the decoded video blocks in order to remove blockiness artifacts from the decoded video blocks.

Decoded picture buffer 82 stores the decoded video blocks. Decoded picture buffer 82 may provide reference pictures for subsequent motion compensation and may also store pictures for presentation on a display device, such as display device 32 of FIG. 1.

Figure 7:
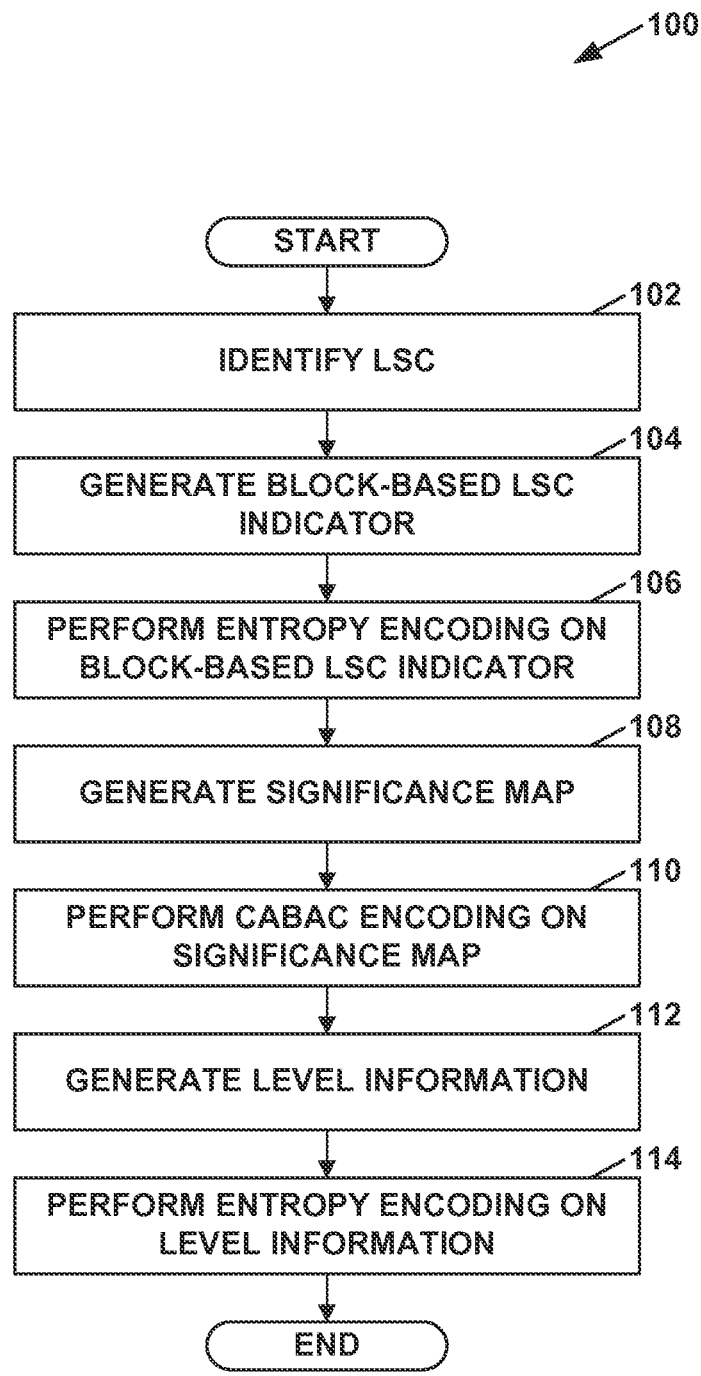
FIG. 7 is a flowchart that illustrates an example operation performed by the video encoder.

FIG. 7 is a flowchart that illustrates an example operation 100 performed by video encoder 20. After CABAC module 56 starts operation 100, video encoder 20 may identify a LSC of a transform coefficient block according to a scanning order (102). After video encoder 20 has identified the LSC of the transform coefficient block, video encoder 20 may generate a block-based LSC indicator that indicates the coordinates of the identified LSC of the transform coefficient block (104).

After generating the block-based LSC indicator, video encoder 20 may perform a CABAC encoding operation on the block-based LSC indicator (106). In various examples, video encoder 20 may perform the CABAC encoding operation on the block-based LSC indicator in various ways. For instance, in some examples, video encoder 20 may first convert each coordinate of the block-based LSC indicator into a binary code. In other words, video encoder 20 may "binarize" the coordinates of the block-based LSC indicator. After binarizing the coordinates, video encoder 20 may select a context model for encoding the binary code that represents the y-coordinate of the block-based LSC indicator. In some instances, video encoder 20 may select the context model for encoding the binary code that represents the y-coordinate based on the x-coordinate of the block-based LSC indicator. Video encoder 20 may use the selected context model when encoding one or more bins of the binary code that represents the y-coordinate. Similarly, video encoder 20 may select a context model for encoding the binary code that represents the x-coordinate of the block-based LSC indicator based on the y-coordinate of the block-based LSC indicator. Video encoder 20 may use the selected context model when encoding one or more bins of the binary code that represents the x-coordinate.

There may be a statistical relationship between the x-coordinate and the y-coordinate of the block-based LSC indicator. For instance, significant transform coefficients tend to cluster around the DC transform coefficients of transform coefficient blocks. Thus, if the x-coordinate is relatively close to the DC transform coefficient, the y-coordinate is also likely to be relatively close to the DC transform coefficient, and vice versa. By selecting the context model for the y-coordinate based on the x-coordinate, video encoder 20 may be able to exploit this statistical relationship in order to more accurately select the context model for the y-coordinate. Likewise, by selecting the context model for the x-coordinate based on the y-coordinate, video encoder 20 may be able to exploit this statistical relationship in order to more accurately select the context model for the x-coordinate.

In some examples, video encoder 20 may interleave the entropy encoding operations of symbols for the x and y coordinates. For example, video encoder 20 may first perform the entropy encoding operation for the first symbol of the x coordinate. Assuming that video encoder 20 represents the x coordinate as a unary number, the first symbol of the x coordinate is 0 if the x coordinate is 0 and 1 otherwise. After encoding the first symbol of the x coordinate, video encoder 20 may perform the entropy encoding operation on a first symbol of the y coordinate. Video encoder 20 may use different contexts to encode the first symbol of the y coordinate depending on the value of the first symbol of the x coordinate. Then, if the x coordinate is larger than 0, video encoder 20 may perform the entropy encoding operation on the second symbol of the x coordinate. Video encoder 20 may use different contexts to encode the second symbol of the x coordinate depending on the value of the first symbol of the y coordinate. Video encoder 20 may continue encoding symbols of the x and y coordinates until video encoder 20 has encoded each of the symbols of the x and y coordinates.

In some examples, video encoder 20 may map the transform coefficients from a transform coefficient block into another 2D transform coefficient block using a scanning order. For instance, the other 2D transform coefficient block may be eight positions wide. In this example, video encoder 20 may map the first eight transform coefficients of the transform coefficient block as determined by the scanning order into the first row of the other 2D transform coefficient block, the second eight transform coefficients of the transform coefficient block as determined by the scanning order into the second row of the other 2D transform coefficient block, and so on. In this example, video encoder 20 may then identify the last significant transform coefficient of the other 2D transform coefficient block according to the scanning order and generate a block-based LSC indicator that indicates the last significant transform coefficient of the other 2D block. In this example, a statistical relationship may exist between lower row numbers and the probability of a transform coefficient being significant. For instance, the probability of a transform coefficient being significant may be higher in low row numbers than in high row numbers. Video encoder 20 may exploit this statistical relationship when performing the entropy encoding operation on the block-based LSC indicator. For instance, video encoder 20 may first perform the entropy encoding operation on the y coordinate and then perform the entropy encoding operation on the x coordinate. When video encoder 20 performs the entropy encoding operation on the x coordinate, video encoder 20 may select a context model based on the y coordinate.

Furthermore, video encoder 20 may generate a significance map for the transform coefficient block (108). In some examples, video encoder 20 may generate the significance map and identify the LSC of the transform coefficient block in parallel.

In various examples, video encoder 20 may generate the significance map in various ways. For example, video encoder 20 may perform a coding pass that processes each of the transform coefficients according to a reverse scanning order. The reverse scanning order may be the inverse of the scanning order used to identify the LSC. In other examples, video encoder 20 may use the same scanning order to generate the significance map for the transform coefficient block as video encoder 20 uses to identify the LSC. For each transform coefficient processed during the coding pass, video encoder 20 may generate and CABAC encode a significance flag for the transform coefficient if the ordinal position of the transform coefficient according to the scanning order is before the ordinal position of the LSC according to the scanning order.

In another example, video encoder 20 may first generate a 2D block to serve as the significance map. In this example, video encoder 20 may scan through the transform coefficient block. As video encoder 20 scans through the transform coefficient block, video encoder 20 may indicate in the 2D significance map whether corresponding transform coefficients of the transform coefficient block are significant or not significant.

Furthermore, video encoder 20 may perform a CABAC encoding operation on the significance map (110). In some examples, video encoder 20 may interleave steps 108 and 110. For instance, video encoder 20 may generate a significance flag for a first transform coefficient. Video encoder 20 may then perform a CABAC encoding operation on the significance flag for the first transform coefficient. After performing the CABAC encoding operation on the significance flag for the first transform coefficient, video encoder 20 may generate a significance flag for a second transform coefficient and then perform a CABAC encoding operation on the significance flag for the second transform coefficient, and so on.

Video encoder 20 may perform the CABAC encoding operation on the significance map in various ways. For example, video encoder 20 may select a context model based on the LSC of the transform coefficient block. There may be a statistical relationship between the position of the LSC and the value of the next significance flag (in reserve scanning order) of the significance map. For instance, if video encoder 20 uses a reverse scanning order to generate the significance map and the LSC of the transform coefficient block is relatively distant from the DC transform coefficient of the transform coefficient block, the probability of the next significance flag being 1 are relatively greater than if the LSC of the transform coefficient block is relatively close to the DC transform coefficient of the transform coefficient block. By selecting the context model based on the LSC of the transform coefficient block, video encoder 20 may be able to exploit this statistical relationship in order to more accurately select the context model for encoding the significance map. After selecting the context model for the significance map, video encoder 20 may use the context model to CABAC encode one or more significance flags of the significance map. During the CABAC encoding operation on the significance map, video encoder 20 may use one or more other context models to CABAC encode subsequent significance flags of the significance map.

In other examples, video encoder 20 may exploit the statistical relationship between the LSC and significance map in other ways. For example, video encoder 20 may use one set of contexts to CABAC encode the significance map if the ordinal position of the LSC is greater than a given threshold and another set of contexts to encode the significance map if the ordinal position of the LSC is not greater than the given threshold. Using different contexts in this manner may improve coding efficiency.

In another example, video encoder 20 may exploit the statistical relationship between the LSC and the significance map by grouping transform coefficients. For instance, in this example, video encoder 20 may group three transform coefficients together and encode the resulting group as a single transform coefficient. Thus, video encoder 20 may encode three transform coefficients at a time. If all three transform coefficients in a group are 0, then video encoder 20 may encode the three transform coefficients as 0. If not, video encoder 20 may generate a 1 flag and flags indicating which of the three corresponding transform coefficients are significant.

In some instances, all of the significant transform coefficients of a transform coefficient block may be located within a small region at the upper left corner of the transform coefficient block. For example, all of the significant transform coefficients of a transform coefficient block may be located within a 4×4 region at the upper left corner of the transform coefficient block. In such instances, it may require fewer bits to indicate the LSC of the transform coefficient block using a scan-based LSC indicator than a block-based LSC indicator. Hence, in some examples, video encoder 20 may generate a scan-based LSC indicator instead of a block-based LSC indicator when all of the significant transform coefficients are within the region. In such examples, video encoder 20 may generate a block-based LSC indicator if the transform coefficient block includes one or more significant transform coefficients outside the region. Furthermore, in some such examples, video encoder 20 may include a flag in the bitstream to indicate whether the LSC is indicated using a block-based LSC indicator or a scan-based LSC indicator.

In addition, video encoder 20 may generate level information for the transform coefficients in the transform coefficient block (112). As described above, the level information for the transform coefficients may include level-greater-than-one flags, level-greater-than-two flags, sign flags, and level-remainder elements.

Furthermore, video encoder 20 may perform CABAC encoding operations on at least some of the level information for the transform coefficients (114). In some examples, video encoder 20 may interleave steps 112 and 114. For instance, video encoder 20 may perform separate coding passes for level-greater-than-one flags, level-greater-than-two flags, sign flags, and level-remainder elements. During the coding pass for the level-greater-than-one flags, video encoder 20 may generate and CABAC encode a level-greater-than-one flag for a first transform coefficient, generate and CABAC encode a level-greater-than-one flag for the next transform coefficient, and so on. Similarly, during the coding pass for the level-greater-than-two flags, video encoder 20 may generate and CABAC encode a level-greater-than-two flag for a first transform coefficient, generate and CABAC encode a level-greater-than-two flag for the next transform coefficient, and so on. During the coding pass for the sign flags, video encoder 20 may generate a sign flag for a first transform coefficient, generate a sign flag for a next transform coefficient, and so on. In this example, video encoder 20 does not CABAC encode the sign flags. During the coding pass for the level-remainder elements, video encoder 20 may generate a level-remainder element and identify a corresponding Golomb-Rice code for a first transform coefficient, generate a level-remainder element and identify a corresponding Golomb-Rice code for the next transform coefficient, and so on. In this example, video encoder 20 may not generate a level-greater-than-one flag, a level-greater-than-two flag, a sign flag, or a level-remainder element for a transform coefficient if the transform coefficient flag is not significant.

In some examples, when video encoder 20 binarizes the level information of a transform coefficient, the first bin of the binarized level information may indicate whether the transform coefficient is significant. Thus, in such examples, generating the significance map in step 108 may be part of generating the level information in step 112 and CABAC encoding the significance map in step 110 may be part of CABAC encoding the level information in step 114.

Figure 8:
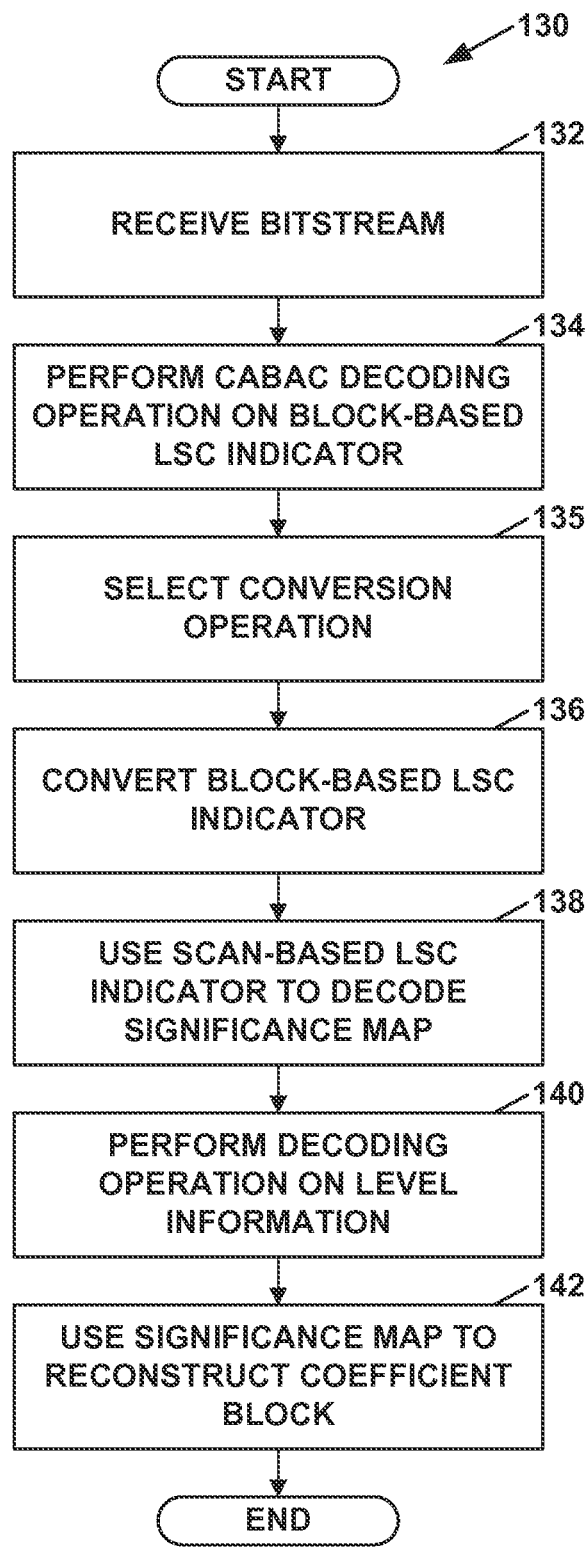
FIG. 8 is a flowchart that illustrates an example operation to decode a transform coefficient block.

FIG. 8 is a flowchart that illustrates an example operation 130 to decode a transform coefficient block. After video decoder 30 starts operation 130, video decoder 30 may receive a bitstream that comprises data representing a block-based LSC indicator for a transform coefficient block associated with a TU, a significance map for the transform coefficient block, and level information for the transform coefficient block (132). The bitstream may comprise other encoded video data.

After receiving the data that represents the block-based LSC indicator, video decoder 30 may perform a CABAC decoding operation to decode the encoded block-based LSC indicator (134). Thus, by performing the CABAC decoding operation, video decoder 30 may receive, from the bitstream of encoded video data, a block-based LSC indicator for a LSC of a block of transform coefficients.

After video decoder 30 performs the CABAC decoding operation to decode the block-based LSC indicator, video decoder 30 may select a conversion operation (135). In some examples, video decoder 30 may select the conversion operation based on the scanning order. Video decoder 30 may then use the selected conversion operation to convert the block-based LSC indicator into a scan-based LSC indicator (136). In various examples, video decoder 30 may convert the block-based LSC indicator into the scan-based LSC indicator in various ways. For example, video decoder 30 may use the example operations shown in FIGS. 9-12 to convert the block-based LSC indicator into the scan-based LSC indicator. In other examples, video decoder 30 may perform a combination of one or more of the example operations of FIGS. 9-12 to convert the block-based LSC indicator into the scan-based LSC indicator. Furthermore, in yet other examples, video decoder 30 does not select a conversion operation after decoding a block-based LSC indicator. Rather, in some such examples, video decoder 30 may only be configured to perform one specific conversion operation.

Subsequently, video decoder 30 may use the scan-based LSC indicator to decode the significance map for the transform coefficient block (138). Video decoder 30 may use the scan-based LSC indicator to decode the significance map in various ways.

For example, video encoder 20 may not encode significance flags for transform coefficients occurring after the LSC in coding order. Consequently, the number of significance flags in the significance map can vary among transform coefficient blocks. Because the number of significance flags may vary, video decoder 30 may not be able to determine based on the size of the transform coefficient block how many significance flags are in the significance map of the transform coefficient block. Thus, when video decoder 30 decodes the significance map, video decoder 30 may need to be able to determine whether video decoder 30 has parsed all of the significance flags of the significance map from the bitstream. Accordingly, video decoder 30 may continue parsing significance flags from the bitstream until the number of significance flags parsed from the bitstream is equal to the ordinal position of the LSC (i.e., position indicated by the scan-based LSC indicator). In this way, video decoder 30 may use the scan-based LSC indicator to determine whether the significance map includes significance flags for the transform coefficients of the transform coefficient block.

In another example, the scan-based LSC indicator may indicate the number of bins that indicate significant transform coefficients to be decoded. In addition, as described above, there may be a statistical relationship between the number of transform coefficients occurring prior the LSC in scanning order and the probability of a bin of the significance map being a 1 or 0. The scan-based LSC indicator indicates the number of transform coefficients occurring prior to the LSC in the scanning order. Accordingly, video decoder 30 may select, based on the scan-based LSC indicator, a context model from among a plurality of available context models. Video decoder 30 may then use the selected context model to decode one or more bins of the significance map. During the CABAC decoding operation for the significance map, video decoder 30 may switch to one or more other context models.

In some examples, a transform coefficient block may include a plurality of sub-blocks. Video decoder 30 may identify, based on the scan-based LSC indicator, a last significant sub-block from among the plurality of sub-blocks, the last significant sub-block containing the LSC. Furthermore, video decoder 30 may perform a first coding pass that processes the last significant sub-block and ones of the sub-blocks that occur before the last significant sub-block according to a first reverse scanning order that starts with the last significant sub-block. For each of the sub-blocks processed during the first coding pass, video decoder 30 may perform a second coding pass that processes transform coefficients in the sub-block according to a second reverse scanning order. The second reverse scanning order may be the same or different than the first reverse scanning order. For each transform coefficient processed during the second coding pass, video decoder 30 may determine, based on the scan-based LSC indicator, whether the significance map includes a significance flag for the transform coefficient.

After video decoder 30 decodes the significance map for the transform coefficient block, video decoder 30 may perform a decoding operation on the level information of the transform coefficient block (140). For example, the level information of the transform coefficient block may include level-greater-than-one flags, level-greater-than-two flags, sign flags, and level-remainder elements. The level-greater-than-one flags and the level-greater-than-two flags may be CABAC encoded and the level-remainder elements may be encoded as Golomb-Rice codes. In this example, video decoder 30 may perform CABAC decoding operations to decode the level-greater-than-one flags and the level-greater-than-two flags and may convert the Golomb-Rice codes back into the level-remainder elements.

In addition, video decoder 30 may use the significance map, the scan-based LSC indicator, and the transform coefficient level information of the transform coefficient block to reconstruct the transform coefficient block from the level information for the transform coefficient block (142). In some examples, video decoder 30 may interleave steps 140 and 142. For example, video decoder 30 may store the transform coefficients in a two-dimensional array. In this example, video decoder 30 may add or adjust transform coefficients in the array as video decoder 30 decodes the level information in step 140.

As described above, the level information for the transform coefficient block may comprise a series of level-greater-than-one flags, a series of level-greater-than-two flags, a series of a sign flags, and a series of level-remainder elements. In some examples, the series of level-greater-than-one flags, the series of level-greater-than-two flags, the sign flags, and the level-remainder elements do not include entries regarding the non-significant transform coefficients within the transform coefficient block. Hence, the series of level-greater-than-one flags, the series of level-greater-than-two flags, the sign flags, and the level-remainder elements may not include information that indicate the positions of the transform coefficient block that correspond to the level-greater-than-one flags, the level-greater-than-two flags, the sign flags, and the level-remainder elements. Accordingly, video decoder 30 may use the significance map to determine the positions within the transform coefficient block that correspond to the level-greater-than-one flags, the level-greater-than-two flags, the sign flags, and the level-remainder elements. In this instance, video decoder 30 may then use the level-greater-than-one flags, level-greater-than-two flags, sign flags, and level-remainder elements to reconstruct the transform coefficient block.

As described above, in some examples, the first bin of the binarized level information of a transform coefficient may indicate whether the transform coefficient is significant. Thus, the significance map may be integrated into the binarized level information of the transform coefficients. In such examples, performing the entropy decoding operation on the significance map in step 138 may be part of performing the CABAC decoding operation on the level information in step 140.

FIG. 9 is a flowchart that illustrates an example non-iterative operation 150 to convert a block-based LSC indicator for a transform coefficient block into a scan-based LSC indicator for the transform coefficient block. In the example of FIG. 9, operation 150 assumes that the scanning order is the zigzag scanning order. After video decoder 30 starts operation 150, video decoder 30 may determine the value of a diagonal number variable (152). Video decoder 30 may determine the value of the diagonal number variable by adding the y-coordinate of the block-based LSC indicator and the x-coordinate of the block-based LSC indicator.

Next, video decoder 30 may determine whether the diagonal number variable is greater than a block width of the transform coefficient block (154). If the diagonal number is greater than the block width of the transform coefficient block ("YES" of 154), video decoder 30 may calculate an initial value for the scan-based LSC indicator (156). Video decoder 30 may calculate the initial value for the scan-based LSC indicator as follows: ScanPositionLast=DiagNum*(DiagNum+1))>>1, where "ScanPositionLast" is the scan-based LSC indicator, "DiagNum" represents the diagonal number variable, and ">>" represents the right-shift operation.

Next, video decoder 30 may determine whether the diagonal number variable is an odd number (158). In some examples, video decoder 30 may determine whether the diagonal number variable is odd as follows: (DiagNum % 2)==1. If the diagonal number variable is an odd number ("YES" of 158), video decoder 30 may recalculate the scan-based LSC indicator based on the y-coordinate of the block-based LSC indicator (160). For instance, video decoder 30 may recalculate the scan-based LSC indicator by adding the y-coordinate of the block-based LSC indicator to the initial value of the scan-based LSC indicator. Otherwise, if the diagonal number variable is not an odd number ("NO" of 158), video decoder 30 may recalculate the scan-based LSC indicator based on the x-coordinate of the block-based LSC indicator (162). For instance, video decoder 30 may recalculate the scan-based LSC indicator by adding the x-coordinate of the block-based LSC indicator to the initial value of the scan-based LSC indicator.

If the diagonal number is not greater than the block width ("NO" of 154), video decoder 30 may calculate the value of a temporary variable (164). Video decoder 30 may calculate the value of the temporary variable as follows: (BlockWidth−1)<<1)−DiagNum, where "BlockWidth" indicates the width of the transform coefficient block and "<<" represents the left shift operation. After calculating the temporary value, video decoder 30 may calculate an initial value of the scan-based LSC indicator (166). Video decoder 30 may calculate the initial value of the scan-based LSC indicator as follows: MaxNumCoeffM1−((T*(T+1))>>1), where "MaxNumCoeffM1" is the maximum number of transform coefficients in the transform coefficient block and "T" is the temporary variable.

Video decoder 30 may then determine whether the temporary variable is odd (168). If the temporary variable is odd ("YES" of 168), video decoder 30 may recalculate the scan-based LSC indicator based on the y-coordinate of the block-based LSC indicator (170). For instance, video decoder 30 may recalculate the scan-based LSC indicator as follows: ScanPositionLast=ScanPositionLast−BlockWidth+1+PositionLastY, where "ScanPositionLast" is the scan-based LSC indicator, "BlockWidth" is the width of the transform coefficient block, and "PositionLastY" is the y-coordinate of the block-based LSC indicator.

Otherwise, if the temporary variable is not odd ("NO" of 168), video decoder 30 may recalculate the scan-based LSC indicator based on the x-coordinate of the block-based LSC indicator (172). For instance, video decoder 30 may recalculate the scan-based LSC indicator as follows: ScanPositionLast=ScanPositionLast−BlockWidth+1+PositionLastX, where "ScanPositionLast" is the scan-based LSC indicator, "BlockWidth" is the width of the transform coefficient block, and "PositionLastX" is the x-coordinate of the block-based LSC indicator.

The following pseudo-code describes a non-iterative algorithm in accordance with the example of FIG. 9 that derives the scan-based LSC indicator from the coordinates specified by the block-based LSC indicator.

```
1.   DiagNum = PositionLastY + PositionLastX
2.   If ( DiagNum < BlockWidth)
       a.   ScanPositionLast = ( DiagNum * (DiagNum + 1) ) >> 1
       b.   If ((DiagNum % 2) == 1 )
              i.    ScanPositionLast = ScanPositionLast +
                    PositionLastY
       c.   Else
              i.    ScanPositionLast = ScanPositionLast +
                    PositionLastX
3.   Else
       a.   T = ( (BlockWidth−1) << 1 ) − DiagNum
       b.   ScanPositionLast = MaxNumCoeffM1 − (( T * (T +
            1) ) >> 1)
       c.   If ((T % 2) == 1 )
              i.    ScanPositionLast = ScanPositionLast −
                    BlockWidth + 1 + PositionLastY
       d.   Else
              i.    ScanPositionLast = ScanPositionLast −
                    BlockWidth + 1 + PositionLastX
```

In this pseudo-code, "PositionLastY" and "PositionLastX" are the x and y coordinates of the last transform coefficient (assuming the DC component is at coordinates (0, 0)), and "BlockWidth" is the width of the block, << is the left-shift operation, >> is the right-shift operation, % is the modulus operation, and "MaxNumCoeffM1" is the maximum number of transform coefficients that the transform coefficient block may have (i.e., BlockWidth*BlockHeight−1).

The following pseudo-code is similar to the pseudo-code above, but converts a block-based LSC indicator into a scan-based LSC indicator when a top-right to bottom-left diagonal scan is used:

```
1.   DiagNum = PositionLastY + PositionLastX
2.   If ( DiagNum < BlockWidth)
       a.   ScanPositionLast = ( DiagNum * (DiagNum + 1) ) >> 1
       b.   ScanPositionLast = ScanPositionLast + PositionLastX
3.   Else
       a.   T = ( (BlockWidth−1) << 1 ) − DiagNum
       b.   ScanPositionLast = MaxNumCoeffM1 − (( T * (T +
            1) ) >> 1)
       c.   If ((T % 2) == 1 )
              i.    ScanPositionLast = ScanPositionLast −
                    BlockWidth + 1 + PositionLastY
       d.   Else
              i.    ScanPositionLast = ScanPositionLast −
                    BlockWidth + 1 + PositionLastX
```

The following pseudo-code is similar to the pseudo-code above, but converts a block-based LSC indicator into a scan-based LSC indicator when a bottom-left to top-right diagonal scan is used:

```
1.   DiagNum = PositionLastY + PositionLastX
2.   If ( DiagNum < BlockWidth)
       a.   ScanPositionLast = ( DiagNum * (DiagNum + 1) ) >> 1
       b.   ScanPositionLast = ScanPositionLast + PositionLastY
3.   Else
       a.   T = ( (BlockWidth−1) << 1 ) − DiagNum
       b.   ScanPositionLast = MaxNumCoeffM1 − (( T * (T +
```

```
        1 ) ) >> 1)
    c.  If ((T % 2) == 1 )
        i.      ScanPositionLast = ScanPositionLast –
                BlockWidth + 1 + PositionLastY
    d.  Else
        i.      ScanPositionLast = ScanPositionLast –
                BlockWidth + 1 + PositionLastX
```

FIG. 10 is a flowchart that illustrates another example non-iterative operation 200 to convert a block-based LSC indicator into a scan-based LSC indicator. In the example of FIG. 10, video decoder 30 may store a transform coefficient block in memory in a 1-D array. In this 1-D array, transform coefficients in a top row of the transform coefficient block are followed by transform coefficients in a next lower row, which are followed by transform coefficients associated with a next lower row, and so on. After video decoder 30 starts operation 200, video decoder 30 may set the scan-based LSC indicator to a value that indicates a position in the 1-D array that is associated with the coordinates indicated by the block-based LSC indicator (202). Video decoder 30 may determine the position in the 1-D array by multiplying the y-coordinate specified by the block-based LSC indicator by the width of the transform coefficient block and then adding the x-coordinate specified by the block-based LSC indicator. If the scanning order is the horizontal scanning order, video decoder 30 may not need to perform any further processing to obtain the scan-based LSC indicator.

Next, video decoder 30 may determine whether the scanning order is the zigzag scanning order (204). In response to determining that the scanning order is the zigzag scanning order ("YES" of 204), video decoder 30 may calculate a diagonal number ("uiD") as a sum of the y-coordinate of the block-based LSC indicator ("uiPosLastY") and the x-coordinate of the block-based LSC indicator ("uiPosLastX") (206). Video decoder 30 may then determine whether the diagonal number is less than the width of the transform coefficient block ("uiWidth") (208). In response to determining that the diagonal number is less than the width of the transform coefficient block ("YES" of 208), video decoder 30 may calculate a value for the scan-based LSC indicator ("uiScanPosLast") based on the diagonal number (210). For example, video decoder 30 may calculate the initial value for the scan-based LSC indicator as follows: uiScanPosLast=uiD*(uiD+1))>>1, where "uiScanPosLast" is the scan-based LSC indicator and "uiD" is the diagonal number. In this example, if the diagonal number is an even number, video decoder 30 may then calculate the final value for the scan-based LSC indicator by adding the y-coordinate of the block-based LSC indicator to the initial value of the scan-based LSC indicator. If the diagonal number is an odd number, video decoder 30 may calculate the final value for the scan-based LSC indicator by adding the x-coordinate of the block-based LSC indicator to the initial value of the scan-based LSC indicator.

Otherwise, in response to determining that the position identifier is not less than the width of the transform coefficient block ("NO" of 208), video decoder 30 may calculate a temporary value ("uiDI") (212). Video decoder 30 may calculate the temporary value as follows: uiDI=((uiWidth–1)<<1)–uiD, where "uiDI" is the temporary value, "uiWidth" is the width of the transform coefficient block, and "uiD" is the diagonal number. After calculating the temporary value, video decoder 30 may calculate the scan-based LSC indicator based on the temporary value (214). Video decoder 30 may calculate an initial value of the scan-based LSC indicator as follows: uiScanPosLast=uiMaxNumCoeffM1–(uiDI*(uiDI+1)>>1), where "uiScanPosLast" is the scan-based LSC indicator, "uiMaxNumCoeffM1" is the maximum number of transform coefficients that the transform coefficient block may have, and "uiDI" is the temporary value. If the temporary value is even, video decoder 30 may calculate the final value of the scan-based LSC indicator by subtracting (uiWidth–1–uiPosLastY) from the initial value of the scan-based LSC indicator, where "uiWidth" is the width of the transform coefficient block and "uiPosLastY" is the y-coordinate of the block-based LSC indicator. If the temporary value is odd, video decoder 30 may calculate the final value of the scan-based LSC indicator by subtracting (uiWidth–1–uiPosLastX) from the initial value of the scan-based LSC indicator, where "uiWidth" is the width of the transform coefficient block and "uiPosLastX" is the x-coordinate of the block-based LSC indicator.

In response to determining that the scanning order is not the zigzag scanning order ("NO" of 204), video decoder 30 may determine whether the scanning order is the vertical scanning order (216). In response to determining that the scanning order is the vertical scanning order ("YES" of 216), video decoder 30 may calculate the scan-based LSC indicator from the block-based LSC indicator and the size of the transform coefficient block (218). For instance, video decoder 30 may calculate the scan-based LSC indicator as: uiScanPosLast=uiPosLastY+(uiPosLastX<<uiLog 2BlockSize), where uiScanPosLast is the scan-based LSC indicator, uiPosLastY is the y-coordinate of the block-based LSC indicator, uiPosLastX is the x-coordinate of the block-based LSC indicator, and "uiLog 2BlockSize" is the log-base 2 of the size of the transform coefficient block.

The following code describes an example algorithm for converting the block-based LSC indicator into a scan-based LSC indicator when the scanning order is the horizontal, vertical, or zigzag scanning order in accordance with the example of FIG. 10. The storage in memory of the transform coefficient block is assumed to be row-wise.

```
/* Code for Zig-zag scan */
    UInt uiScanPosLast =       uiBlkPosLast;      // –> Horizontal
scan
    if( uiScanIdx == SCAN_ZIGZAG )                // –> Zig-zag
                                                      scan
    {
        UInt uiD =             uiPosLastY + uiPosLastX;
        if( uiD < uiWidth )
        {
            uiScanPosLast =    ( uiD * ( uiD + 1 ) ) >> 1;
            uiScanPosLast +=   uiD % 2 ? uiPosLastY : uiPosLastX;
        }
        else
        {
            UInt uiDI =        ( (uiWidth–1) << 1 ) – uiD;
            uiScanPosLast =    uiMaxNumCoeffM1 – ( uiDI * ( uiDI +
                                   1 ) >> 1 );
            uiScanPosLast –=   uiDI % 2 ? uiWidth – 1 – uiPosLastY :
uiWidth – 1 – uiPosLastX;
        }
    }
    else if( uiScanIdx == SCAN_VER )              // –> Vertical scan
    {
        uiScanPosLast = uiPosLastY +
            (uiPosLastX<<uiLog2BlockSize);
    }
```

Video decoder 30 may perform a similar operation with regard to the diagonal scanning order (as opposed to the zig-zag scan discussed above). In such an operation, video decoder 30 may calculate the scan-based LSC indicator in step 214 as uiScanPosLast=uiMaxNumCoeffM1−(uiDI*(uiDI+1)>>1)−uiWidth+1+uiPosLastX, where "uiScanPosLast" is the scan-based LSC indicator, "uiMaxNumCoeffM1" is the maximum number of transform coefficients in the transform coefficient block, "uiDI" is the temporary value, "uiWidth" is the width of the transform coefficient block, and "uiPosLastX" is the x-coordinate of the block-based LSC indicator. The following code describes an example algorithm for converting the block-based LSC indicator into a scan-based LSC indicator when the scanning order is the diagonal scanning order.

```
/* Code for diagonal scan */
     UInt uiScanPosLast =     uiBlkPosLast;        // –> Horizontal
                                                       scan
     if( uiScanIdx == SCAN_DIAGONAL )              // –> Diagonal scan
     {
         UInt uiD =           uiPosLastY + uiPosLastX;
         if( uiD < uiWidth )
         {
             uiScanPosLast =   ( uiD * ( uiD + 1 ) ) >> 1;
             uiScanPosLast +=  uiD % 2 ? uiPosLastY : uiPosLastX;
         }
         else
         {
             UInt uiDI =       ( (uiWidth−1) << 1 ) − uiD;
             uiScanPosLast =   uiMaxNumCoeffM1 − ( uiDI * ( uiDI +
1 ) >> 1 ) − uiWidth + 1 + uiPosLastX;
         }
     }
     else if( uiScanIdx == SCAN_VER )              // –> Vertical scan
     {
         uiScanPosLast = uiPosLastY +
         (uiPosLastX<<uiLog2BlockSize);
     }
```

FIG. 11 is a flowchart that illustrates another example operation 250 to convert a block-based LSC indicator into a scan-based LSC indicator. As illustrated in the example of FIG. 11, video decoder 30 may store a lookup table (252). The lookup table maps block-based LSC indicators to scan-based LSC indicators according to the scanning order. For example, if the scanning order is the zigzag scanning order, the lookup table may include an entry that maps the coordinates (1, 1) to the scan-based LSC indicator "6." In some examples, video decoder 30 may store different lookup tables for different scanning orders and different transform coefficient block sizes.

After video decoder 30 stores the lookup table, video decoder 30 may receive the block-based LSC indicator (254). After receiving the block-based LSC indicator, video decoder 30 may access the lookup table to retrieve the scan-based LSC indicator that corresponds to the block-based LSC indicator (256). In some examples, video decoder 30 generates a single value based on the x and y coordinates of the block-based LSC indicator. For instance, video decoder 30 may generate the single value by multiplying the y-coordinate by a width of the transform coefficient block and then adding the x-coordinate. In such examples, video decoder 30 may use the single value as an index to retrieve the scan-based LSC indicator from the lookup table.

Video decoder 30 may use additional operations to convert block-based LSC indicators to scan-based LSC indicators. For example, video decoder 30 may use the following pseudo-code to convert a block-based LSC indicator to a scan-based LSC indicator when transform coefficients are scanned in a sub-block diagonal scanning order. In this sub-block diagonal scanning order, video decoder 30 processes sub-blocks in a top-right to bottom-left diagonal order and scans transform coefficients within each of the sub-blocks in a top-right to bottom-left diagonal order.

```
     uiScanPosLast =        0;
     UInt sWidth =          uiWidth >> 2;
     UInt sX =              uiPosLastX >> 2;
     UInt sY =              uiPosLastY >> 2;
     UInt uiDs =            sX + sY;
     if( uiDs < sWidth )
     {
         uiScanPosLast +=   sX + (( uiDs * ( uiDs + 1 ) ) >> 1);
     }
     else
     {
         UInt uiDI =        ( (sWidth−1) << 1 ) − uiDs;
         uiScanPosLast +=   sWidth*(sWidth−1) − ( uiDI * ( uiDI + 1
) >> 1 ) + sX;
     }
     uiPosLastX −=          sX<<2;
     uiPosLastY −=          sY<<2;
     uiScanPosLast <<=      4;
     UInt uiD =             uiPosLastY + uiPosLastX;
     if( uiD < 4 )
     {
         uiScanPosLast +=   uiPosLastX + (( uiD * ( uiD + 1 ) ) >>
1);
     }
     else
     {
         UInt uiDI =        6 − uiD;
         uiScanPosLast +=   12 − ( uiDI * ( uiDI + 1 ) >> 1 ) +
uiPosLastX;
     }
```

In the pseudo-code above, the "uiWidth" indicates a width of the transform coefficient block, "uiPosLastX" indicates an x-coordinate of the block-based LSC indicator, "uiPosLastY" indicates a y-coordinate of the block-based LSC indicator, and "uiScanPosLast" indicates the scan-based LSC indicator. "sX" indicates the x-coordinate of the top-left transform coefficient of the sub-block containing the last significant transform coefficient. "sY" indicates the y-coordinate of the top-left transform coefficient of the sub-block containing the last significant transform coefficient. The pseudo-code above may represent a combination of operations to convert the block-based LSC indicator to a scan-based LSC indicator because the pseudo-code above first performs an operation to determine the scan order ("uiScanPosLast") of the sub-block that contains the last significant transform coefficient and then performs an operation to determine the scan order of the last significant transform coefficient within the sub-block.

FIG. 12 is a flowchart that illustrates an example iterative operation 300 to convert a block-based LSC indicator into a scan-based LSC indicator. After video decoder 30 starts operation 300, video decoder 30 may receive a block-based LSC indicator that indicates an LSC of a transform coefficient block according to a scanning order (302). Video decoder 30 may then set a position indicator to indicate a first position of the transform coefficient block according to the scanning order (304). In some examples, the position indication may include a first value that indicates a horizontal, x position of a current transform coefficient and a second value that indicates a vertical, y position of the current transform coefficient. For example, if the scanning order starts at the DC component, video decoder 30 may set the position indicator to indicate the position at coordinates (0,0). In addition, video decoder 30 may initialize a scan-based LSC indicator to zero (306).

Video decoder 30 may then advance the position indicated by the position indicator according to the scanning order (308). For example, if the scanning order is the horizontal scanning order and the position indicator currently indicates the position (3, 4), video decoder 30 may advance the position indicated by the position indicator such that the position indicator indicates the position (3, 5). Video decoder 30 may then increment the scan-based LSC indicator (310).

Video decoder 30 may then determine whether the position indicated by the position indicator is the same as the position indicated by the block-based LSC indicator (312). In other words, video decoder 30 may determine whether the indicated positions match. If the position indicated by the position indicator is the same as the position indicated by the block-based LSC indicator, the scan-based LSC indicator indicates the position of the LSC. If the position indicated by the position indicator is not the position indicated by the block-based LSC indicator ("NO" of 312), video decoder 30 may repeat steps 308-312 with the advanced position indicator. If the position indicated by the position indicator is the position indicated by the block-based LSC indicator ("YES" of 312), video decoder 30 may end operation 300.

The following pseudo-code may describe an alternate iterative operation to convert a block-based LSC indicator into a scan-based LSC indicator. In this pseudo-code, video decoder 30 checks each scan position to determine whether the corresponding block-based position is the position indicated by the LSC indicator. Video decoder 30 stops checking positions when the current scan position ("uiBlkPosLast") is equal to the block-based LSC indicator ("uiBlkPos").

```
for( uiScanPosLast = 0; uiScanPosLast < uiMaxNumCoeffM1;
uiScanPosLast++ )
{
    UInt uiBlkPos = scan[ uiScanPosLast ];
    if( uiBlkPosLast == uiBlkPos )
    {
        break;
    }
}
```

Figure 13:
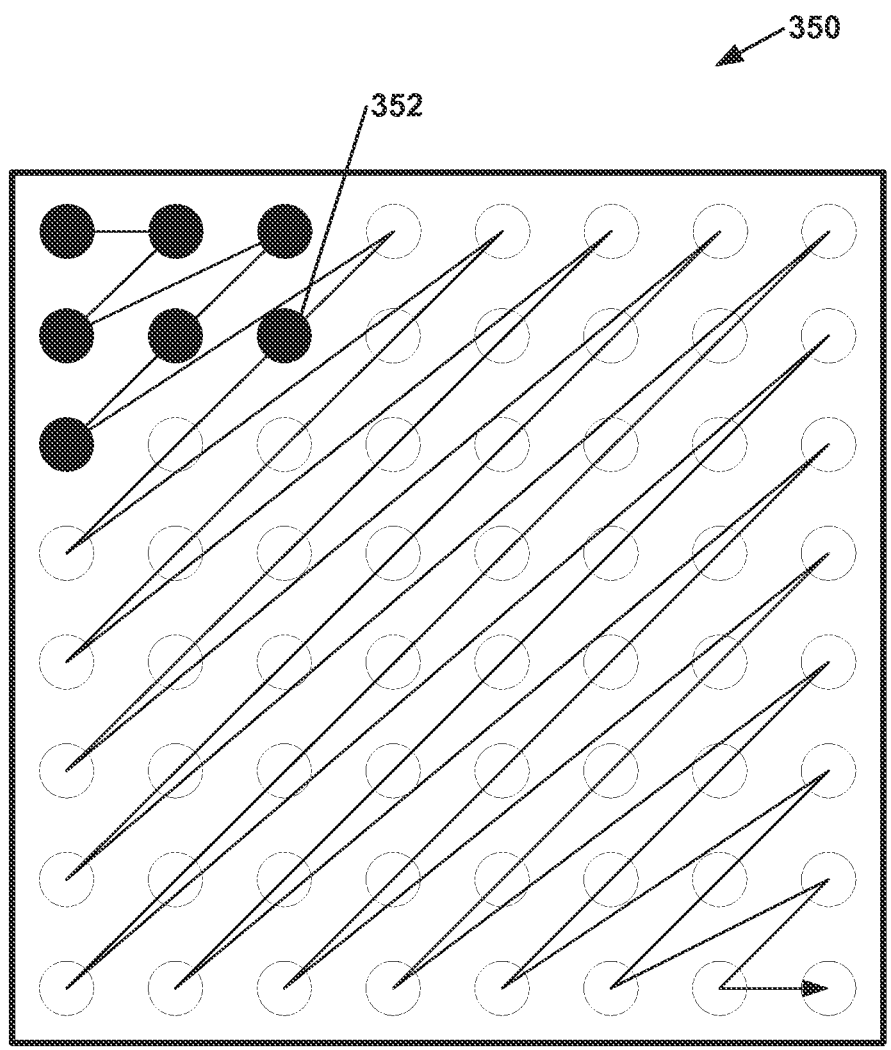
FIG. 13 is a conceptual diagram of a transform coefficient block showing a last significant transform coefficient.

FIG. 13 is a conceptual diagram of a transform coefficient block 350 showing a last significant transform coefficient. In the example of FIG. 13, each circle represents a different transform coefficient in transform coefficient block 350. Black circles in FIG. 13 correspond to significant transform coefficients and white circles correspond to non-significant transform coefficients. Transform coefficient 352 is the last significant transform coefficient of transform coefficient block 350 according to the diagonal scanning order. FIG. 13 represents a diagonal scanning order as an arrow running through the circles. Assuming that the top row of transform coefficient block 350 is row 0 and the leftmost column is column 0, the block-based LSC indicator for transform coefficient 352 indicates coordinates (2, 1). The scan-based LSC indicator for transform coefficient 352 may be the number "7."

It is to be recognized that depending on the embodiment, certain acts or events of any of the methods described herein may be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the methods, systems, and apparatuses disclosed herein may be implemented as electronic hardware, computer software executed by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Moreover, embodiments disclosed herein may be implemented or performed with an electronic device or circuit such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Various examples have been described. These and other examples are within the scope of the following claims.

What is claimed is:

1. A method for decoding video data, the method comprising:
receiving, by an electronic device, a video data bitstream that includes data that represent a block-based last significant coefficient (LSC) indicator;
parsing, by the electronic device, the block-based LSC indicator from the received video data bitstream;
deriving, by the electronic device, a scan-based LSC indicator from the block-based LSC indicator, the block-based LSC indicator indicating coordinates of a last significant coefficient of a block of transform coefficients according to a sub-block scanning order, the block of transform coefficients partitioned into a plurality of sub-blocks, the scan-based LSC indicator indicating an ordinal position of the LSC according to the sub-block scanning order, wherein a sub-block width is equal to uiWidth>>2, where uiWidth is the width of the block of transform coefficients, ">>" represents the right-shift operation, a first value of a scan position variable is equal to 0, and deriving the scan-based LSC indicator comprises:
determining an x-coordinate of a top-left transform coefficient of a sub-block of the plurality of sub-blocks that contains the last significant coefficient by determining uiPosLastX>>2, where uiPosLastX is an x-coordinate of the block-based LSC indicator;

determining a y-coordinate of the top-left transform coefficient of the sub-block that contains the last significant coefficient by determining uiPosLastY>>2, where uiPosLastX is a y-coordinate of the block-based LSC indicator;

determining a value of a first variable by adding the x-coordinate of the top-left transform coefficient of the sub-block that contains the last significant coefficient and the y-coordinate of the top-left transform coefficient of the sub-block that contains the last significant coefficient;

if the value of the first variable is less than the sub-block width, determining a second value of the scan position variable as being equal to the first value of the scan-based indicator plus sX+((uiDs*(uiDs+1))>>1), where sX is the x-coordinate of the top-left transform coefficient of the sub-block that contains the last significant coefficient and uiDs is the first variable;

if the value of the first variable is not less than the sub-block width:

determining a value of a second variable as being equal to ((sWidth−1)<<1)−uiDs, where sWidth is the sub-block width and "<<" represents the left-shift operation; and determining the second value of the scan position variable as being equal to the first value of the scan position variable plus sWidth*(sWidth−1)−(uiDI*(uiDI+1)>>1)+sX, where uiDI is the second variable;

determining a value of an x-coordinate variable as being equal to the x-coordinate of the block-based LSC indicator minus sX<<2;

determining a value of a y-coordinate variable as being equal to the y-coordinate of the block-based LSC indicator minus sY<<2, where sY is the y-coordinate of the top-left transform coefficient of the sub-block that contains the last significant coefficient;

determining a third value of the scan position variable as being equal to the second value of the scan position variable<<4;

determining a value of a third variable as the value of the x-coordinate variable plus the y-coordinate variable;

if the value of the third variable is less than 4, determining the scan-based LSC indicator as the third value of the scan position variable plus uiPosLastX+((uiD*(uiD+1))>>1), where uiPosLastX is the x-coordinate variable and uiD is the third variable;

if the value of the third variable is not less than 4;

determining a value of a fourth variable as 6−uiD; and determining the scan-based LSC indicator as the third value of the scan position variable plus 12−(uiDI*(uiDI+1)>>1)+uiPosLastX, where uiDI is the fourth variable; and decoding, based on the scan-based LSC indicator, a significance map for the block, by the electronic device.

2. The method of claim 1, wherein the sub-block scanning order starts from a DC component of the block.

3. The method of claim 1, wherein decoding the significance map comprises using the scan-based LSC indicator to determine whether the significance map includes significance flags for the transform coefficients.

4. The method of claim 3,
wherein the method further comprises receiving a Context Adaptive Binary Arithmetic Coding (CABAC) encoded version of the significance map;
wherein using the scan-based LSC indicator to decode the significance map comprises:

selecting a context model based on the scan-based LSC indicator; and
using the context model during a CABAC decoding operation that decodes the significance map; and
wherein the method further comprises:
receiving an encoded version of level information for the block; and
using the significance map to decode the level information.

5. The method of claim 4, further comprising:
mapping the level information into the block according to the sub-block scanning order;
performing an inverse quantization operation on transform coefficients in the block to generate an inverse-quantized block;
performing an inverse transform operation on the inverse-quantized block to generate residual data;
performing an intra-prediction operation that generates predicted data; and
performing a reconstruction operation that uses the residual data and the predicted data to generate a reconstructed block, the reconstructed block being a portion of a picture of the video data.

6. A video decoding device comprising: a memory configured to store a block of transform coefficients; and one or more processors in communication with the memory, the one or more processors configured to:
receive a video data bitstream that includes data that represent a block-based last significant coefficient (LSC) indicator;
parse the block-based LSC indicator from the received video data bitstream;
deriving a scan-based LSC indicator from the block-based LSC indicator, the block-based LSC indicator indicating coordinates of a last significant coefficient of a block of transform coefficients according to a sub-block scanning order, the block of transform coefficients partitioned into a plurality of sub-blocks, the scan-based LSC indicator indicating an ordinal position of the LSC according to the sub-block scanning order, wherein a sub-block width is equal to uiWidth>>2, where uiWidth is the width of the block of transform coefficients, ">>" represents the right-shift operation, a first value of a scan position variable is equal to 0, and to derive the scan-based LSC indicator, the one or more processors configured to:

determine an x-coordinate of a top-left transform coefficient of a sub-block of the plurality of sub-blocks that contains the last significant coefficient by determining uiPosLastX>>2, where uiPosLastX is an x-coordinate of the block-based LSC indicator;

determine a y-coordinate of the top-left transform coefficient of the sub-block that contains the last significant coefficient by determining uiPosLastY>>2, where uiPosLastX is a y-coordinate of the block-based LSC indicator;

determine a value of a first variable by adding the x-coordinate of the top-left transform coefficient of the sub-block that contains the last significant coefficient and the y-coordinate of the top-left transform coefficient of the sub-block that contains the last significant coefficient;

if the value of the first variable is less than the sub-block width, determining a second value of the scan position variable as being equal to the first value of the scan-based indicator plus sX+((uiDs*(uiDs+1))>>1), where sX is the x-coordinate of the top-left transform coefficient of the sub-block that contains the last significant coefficient and uiDs is the first variable;
if the value of the first variable is not less than the sub-block width:
determine a value of a second variable as being equal to ((sWidth−1)<<1)−uiDs, where sWidth is the sub-block width and "<<" represents the left-shift operation; and
determine the second value of the scan position variable as being equal to the first value of the scan position variable plus sWidth*(sWidth−1)−(uiDI*(uiDI+1)>>1)+sX, where uiDI is the second variable;
determine a value of an x-coordinate variable as being equal to the x-coordinate of the block-based LSC indicator minus sX<<2;
determine a value of a y-coordinate variable as being equal to the y-coordinate of the block-based LSC indicator minus sY<<2, where sY is the y-coordinate of the top-left transform coefficient of the sub-block that contains the last significant coefficient;
determine a third value of the scan position variable as being equal to the second value of the scan position variable<<4;
determine a value of a third variable as the value of the x-coordinate variable plus the y-coordinate variable;
if the value of the third variable is less than 4, determining the scan-based LSC indicator as the third value of the scan position variable plus uiPosLastX+((uiD*(uiD+1))>>1), where uiPosLastX is the x-coordinate and uiD is the third variable;
if the value of the third variable is not less than 4;
determine a value of a fourth variable as 6−uiD; and
determine the scan-based LSC indicator as the third value of the scan position variable plus 12−(uiDI*(uiDI+1)>>1)+uiPosLastX, where uiDI is the fourth variable; and
decode, based on the scan-based LSC indicator, a significance map for the block.

7. The video decoding device of claim 6, wherein the sub-block scanning order starts from a DC component of the block.

8. The video decoding device of claim 6, wherein the one or more processors are configured to use the scan-based LSC indicator to determine whether the significance map includes significance flags for the transform coefficients.

9. The video decoding device of claim 8,
wherein the one or more processors are configured to receive a Context Adaptive Binary Arithmetic Coding (CABAC) encoded version of the significance map and are configured such that as part of using the scan-based LSC indicator to decode the significance map, the one or more processors:
select a context model based on the scan-based LSC indicator; and
use the context model during a CABAC operation that decodes the significance map; and
wherein the one or more processors are further configured to:
receive an encoded version of level information for the block; and
use the significance map to decode the level information.

10. The video decoding device of claim 9, wherein the one or more processors are further configured to:
map the level information into the block according to the sub-block scanning order;
perform an inverse quantization operation on transform coefficients in the block to generate an inverse-quantized block;
perform an inverse transform operation on the inverse-quantized block to generate residual data;
perform an intra-prediction operation that generates predicted data; and
perform a reconstruction operation that uses the residual data and the predicted data to generate a reconstructed block, the reconstructed block being a portion of a frame of video data.

11. A non-transitory computer-readable storage medium having instructions stored thereon that configure one or more processors to:
receive a video data bitstream that includes data that represent a block-based last significant coefficient (LSC) indicator;
parse the block-based LSC indicator from the received video data bitstream;
deriving a scan-based LSC indicator from the block-based LSC indicator, the block-based LSC indicator indicating coordinates of a last significant coefficient of a block of transform coefficients according to a sub-block scanning order, the block of transform coefficients partitioned into a plurality of sub-blocks, the scan-based LSC indicator indicating an ordinal position of the LSC according to the sub-block scanning order, wherein a sub-block width is equal to uiWidth>>2, where uiWidth is the width of the block of transform coefficients, ">>" represents the right-shift operation, a first value of a scan position variable is equal to 0, and to derive the scan-based LSC indicator, the one or more processors configured to:
determine an x-coordinate of a top-left transform coefficient of a sub-block of the plurality of sub-blocks that contains the last significant coefficient by determining uiPosLastX>>2, where uiPosLastX is an x-coordinate of the block-based LSC indicator;
determine a y-coordinate of the top-left transform coefficient of the sub-block that contains the last significant coefficient by determining uiPosLastY>>2, where uiPosLastX is a y-coordinate of the block-based LSC indicator;
determine a value of a first variable by adding the x-coordinate of the top-left transform coefficient of the sub-block that contains the last significant coefficient and the y-coordinate of the top-left transform coefficient of the sub-block that contains the last significant coefficient;
if the value of the first variable is less than the sub-block width, determining a second value of the scan position variable as being equal to the first value of the scan-based indicator plus sX+((uiDs*(uiDs+1))>>1), where sX is the x-coordinate of the top-left transform coefficient of the sub-block that contains the last significant coefficient and uiDs is the first variable;
if the value of the first variable is not less than the sub-block width:
determine a value of a second variable as being equal to ((sWidth−1)<<1)−uiDs, where sWidth is the sub-block width and "<<" represents the left-shift operation; and
determine the second value of the scan position variable as being equal to the first value of the scan position variable plus sWidth*(sWidth−1)−(uiDI*(uiDI+1)>>1)+sX, where uiDI is the second variable;
determine a value of an x-coordinate variable as being equal to the x-coordinate of the block-based LSC indicator minus sX<<2;
determine a value of a y-coordinate variable as being equal to the y-coordinate of the block-based LSC indicator minus sY<<2, where sY is the y-coordinate of the top-left transform coefficient of the sub-block that contains the last significant coefficient;

determine a third value of the scan position variable as being equal to the second value of the scan position variable<<4;

determine a value of a third variable as the value of the x-coordinate variable plus the y-coordinate variable;

if the value of the third variable is less than 4, determining the scan-based LSC indicator as the third value of the scan position variable plus uiPosLastX+((uiD*(uiD+1))>>1), where uiPosLastX is the x-coordinate variable and uiD is the third variable;

if the value of the third variable is not less than 4;

determine a value of a fourth variable as 6−uiD; and determine the scan-based LSC indicator as the third value of the scan position variable plus 12−(uiDI*(uiDI+1)>>1)+uiPosLastX, where uiDI is the fourth variable; and decode, based on the scan-based LSC indicator, a significance map for the block.

12. The non-transitory computer-readable storage medium of claim 11, wherein the instructions configure the one or more processors to:
    select a context model based on the scan-based LSC indicator;
    use the context model during a Context Adaptive Binary Arithmetic Coding (CABAC) decoding operation that decodes the significance map; and
    use to significance map to decode the level information.

13. The video decoding device of claim 6, wherein the video decoding device comprises at least one of:
    an integrated circuit;
    a microprocessor; or
    a telephone handset.

14. The video decoding device of claim 6, further comprising a display configured to display decoded video data including the block.

* * * * *